US011689668B1

(12) United States Patent
Mathis et al.

(10) Patent No.: US 11,689,668 B1
(45) Date of Patent: *Jun. 27, 2023

(54) PROVIDING IMPROVED CONTACT CENTER AGENT ASSISTANCE DURING A SECURE TRANSACTION INVOLVING AN INTERACTIVE VOICE RESPONSE UNIT

(71) Applicant: Noble Systems Corporation, Atlanta, GA (US)

(72) Inventors: Charles S. Mathis, Cumming, GA (US); Jason S. Conner, Stockbridge, GA (US); Jason P. Ouimette, Berkeley Lake, GA (US)

(73) Assignee: Noble Systems Corporation, Atlanta, GA (US)

( * ) Notice: Subject to any disclaimer, the term of this patent is extended or adjusted under 35 U.S.C. 154(b) by 311 days.

This patent is subject to a terminal disclaimer.

(21) Appl. No.: 16/998,260

(22) Filed: Aug. 20, 2020

Related U.S. Application Data

(63) Continuation of application No. 15/628,938, filed on Jun. 21, 2017, now Pat. No. 10,755,269.

(51) Int. Cl.
*H04M 7/00* (2006.01)
*G06Q 20/38* (2012.01)
(Continued)

(52) U.S. Cl.
CPC .......... *H04M 7/0078* (2013.01); *G06Q 20/12* (2013.01); *G06Q 20/382* (2013.01);
(Continued)

(58) Field of Classification Search
CPC .... G06Q 20/382; G06Q 20/12; G06Q 20/403; G06Q 30/04; H04M 3/51; H04M 3/493; H04M 7/0078
See application file for complete search history.

(56) References Cited

U.S. PATENT DOCUMENTS

| 5,267,305 A | 11/1993 | Prohs et al. |
| 6,157,808 A | 12/2000 | Hollingsworth et al. |
| (Continued) |

OTHER PUBLICATIONS

"Thirumaran et al., An Intelligent Interactive Voice Response System for Banking Domain, Mar. 6-7, 2015, pp. 1-6" (Year: 2015).*

(Continued)

*Primary Examiner* — Courtney P Jones
(74) *Attorney, Agent, or Firm* — Blank Rome LLP

(57) ABSTRACT

A secure payment agent assist ("SPAA") feature provides assistance to a contact center agent during a transaction involving sensitive information, where the sensitive information provided by the remote party is maintained in secure manner, so that the agent is not exposed to it. The agent is assisted by being provided with a pop-up window that allows the agent to invoke a "recollect" and "cancel" function during the transaction. The pop-up window also provides information to the agent making the agent aware of the progress of the transaction as the remote party interacts with an interactive voice response ("IVR") unit. In other embodiments, a configuration parameter allows the prompts for the payment information to be provided by the agent or the IVR.

20 Claims, 11 Drawing Sheets

(51) Int. Cl.
  *H04M 3/51* (2006.01)
  *G06Q 20/12* (2012.01)
  *G06Q 30/04* (2012.01)
  *H04M 3/493* (2006.01)
  *G06Q 20/40* (2012.01)

(52) U.S. Cl.
  CPC .......... *G06Q 20/403* (2013.01); *G06Q 30/04* (2013.01); *H04M 3/493* (2013.01); *H04M 3/51* (2013.01); *H04M 2203/40* (2013.01)

(56) References Cited

U.S. PATENT DOCUMENTS

| | | | |
|---|---|---|---|
| 6,356,634 | B1 | 3/2002 | Noble, Jr. |
| 6,721,416 | B1 | 4/2004 | Farrell |
| 6,862,343 | B1 | 3/2005 | Vacek et al. |
| 7,133,828 | B2 | 11/2006 | Scarano et al. |
| 7,542,902 | B2 | 6/2009 | Scahill et al. |
| 7,548,539 | B2 | 6/2009 | Kouretas et al. |
| 7,574,000 | B2 | 8/2009 | Blair |
| 7,672,845 | B2 | 3/2010 | Beranek et al. |
| 7,930,179 | B1 | 4/2011 | Gorin et al. |
| 7,974,411 | B2 | 7/2011 | Krishnapuram et al. |
| 8,094,790 | B2 | 1/2012 | Conway et al. |
| 8,094,803 | B2 | 1/2012 | Danson et al. |
| 8,155,297 | B1 | 4/2012 | Dhir et al. |
| 8,180,643 | B1 | 5/2012 | Pettay et al. |
| 8,204,180 | B1 | 6/2012 | Narayanan et al. |
| 8,219,401 | B1 | 7/2012 | Pettay et al. |
| 8,249,875 | B2 | 8/2012 | Levanon et al. |
| 8,275,115 | B1 | 9/2012 | Everingham et al. |
| 8,396,205 | B1 | 3/2013 | Lowry et al. |
| 8,396,732 | B1 | 3/2013 | Nies et al. |
| 8,401,155 | B1 | 3/2013 | Barnes et al. |
| 8,463,606 | B2 | 6/2013 | Scott et al. |
| 8,504,371 | B1 | 8/2013 | Vacek et al. |
| 8,531,501 | B2 | 9/2013 | Portman et al. |
| 8,649,499 | B1 | 2/2014 | Koster et al. |
| 8,750,471 | B2 | 6/2014 | Tew |
| 8,761,376 | B2 | 6/2014 | Pande et al. |
| 8,767,948 | B1 | 7/2014 | Riahi et al. |
| 8,781,092 | B2 | 7/2014 | Noble, Jr. |
| 8,831,204 | B1 | 9/2014 | Pycko et al. |
| 8,917,859 | B1 * | 12/2014 | Brimshan ........... H04M 3/5166 379/265.09 |
| 8,949,128 | B2 | 2/2015 | Meyer et al. |
| 9,014,364 | B1 | 4/2015 | Koster et al. |
| 9,225,833 | B1 * | 12/2015 | Koster .............. H04M 3/42221 |
| 2003/0002651 | A1 | 1/2003 | Shires |
| 2004/0008828 | A1 | 1/2004 | Coles et al. |
| 2004/0249650 | A1 | 12/2004 | Freedman et al. |
| 2005/0238161 | A1 | 10/2005 | Yacoub et al. |
| 2005/0286705 | A1 | 12/2005 | Contolini et al. |
| 2006/0050658 | A1 | 3/2006 | Shaffer et al. |
| 2006/0111953 | A1 | 5/2006 | Setya |
| 2006/0233346 | A1 | 10/2006 | McIlwaine et al. |
| 2006/0256954 | A1 | 11/2006 | Patel et al. |
| 2006/0259473 | A1 | 11/2006 | Li et al. |
| 2010/0104086 | A1 | 4/2010 | Park |
| 2010/0158237 | A1 | 6/2010 | McCormack et al. |
| 2010/0161990 | A1 | 6/2010 | Statham et al. |
| 2011/0010173 | A1 | 1/2011 | Scott et al. |
| 2011/0026688 | A1 | 2/2011 | Simpson |
| 2011/0033036 | A1 | 2/2011 | Edwards et al. |
| 2011/0145093 | A1 | 6/2011 | Paradise et al. |
| 2011/0202344 | A1 | 8/2011 | Meyer et al. |
| 2011/0218798 | A1 | 9/2011 | Gavalda |
| 2011/0228919 | A1 * | 9/2011 | Tew ........................ H04M 3/42 379/93.12 |
| 2011/0287748 | A1 | 11/2011 | Angel et al. |
| 2011/0307258 | A1 | 12/2011 | Liberman et al. |
| 2011/0317828 | A1 | 12/2011 | Corfield |
| 2012/0045043 | A1 | 2/2012 | Timpson |
| 2012/0140911 | A1 | 6/2012 | Johansen et al. |
| 2012/0263285 | A1 | 10/2012 | Rajakumar et al. |
| 2013/0003943 | A1 | 1/2013 | Munns et al. |
| 2013/0129069 | A1 | 5/2013 | Peterson |
| 2013/0246053 | A1 | 9/2013 | Scott et al. |
| 2013/0266127 | A1 | 10/2013 | Schachter et al. |
| 2014/0140496 | A1 | 5/2014 | Ripa et al. |
| 2014/0241519 | A1 | 8/2014 | Watson et al. |
| 2014/0257820 | A1 | 9/2014 | Laperdon et al. |
| 2015/0106091 | A1 | 4/2015 | Wetjen et al. |
| 2015/0281445 | A1 | 10/2015 | Kumar et al. |
| 2015/0281446 | A1 * | 10/2015 | Milstein ................ H04M 3/493 379/88.01 |
| 2018/0084110 | A1 * | 3/2018 | Fraizer ................ H04L 63/0421 |

OTHER PUBLICATIONS

U.S. Appl. No. 61/753,641, filed Jan. 17, 2013, Watson et al.

Asterisk DTMF, Voip=Info.o—A Reference Guide to All Things VoIP, four pages, retrieved on Mar. 18, 2013 from www.voip-info.org/wiki/view/Asterosk+DTMF.

Donovan, S; Request for Comments 2976 ("RFC 2976"), The SIP INFO Method; The Internet Society, Oct. 2000, 9 pages, U.S.

Burger, E.; Dolly, M; Request for Comments 4730 ("RFC 4730"), A Session Initiation Protocol (SIP) Event Package for Key Press Stimulus (KPML), The Internet Society, Nov. 2006, 56 pages, U.S.

Kuthan, Jiri; Sisalem, Dorgham; SIP: More Than You Ever Wanted to Know About; Powerpoint Presentation, Mar. 2007, 242 pages, Tekelec, U.S.

Homberg, C; Burger, E; Kaplan, H.; Request for Comments 6086 ("RFC 6086"), Session Initiation Protocol (SIP) Info Method and Package Framework, Internet Engineering Task Force, Jan. 2011, 36 pages, U.S.

Schulzerinne, H; Taylor, T; Request for Comments 4733 ("RFC 4733"), RTP Payload for DTMF Digits, Telephony Tones, and Telephony Signals, The IETF Trust, Dec. 2006, 46 pages, U.S.

Schulzrinne, H; Petrack, S; Request for Comments 2833 ("RFC 2833"), RTP Payload for DTMF Digits, Telephony Tone, and Telephony Signals May 2000, 29 pages, The Internet Society, U.S.

\* cited by examiner

900 —
905 — Payment Collection Action

910 — Scripting  ○ Automatic (Pre-recorded messages will play when prompting for user input)
    ⦿ Manual (Agent will read scripts when prompting for user input)

912

| Data Collection | Timeouts / Attempts |

General

Name  [                    ]

Voxset  [English ▼]

915 — Allow Script Backtracking  ⦿ Yes   ○ No

Introductory Message

920 — Agent display  | For the duration of this payment collection process, your privacy is being protected. I will not be able to see your payment card information or hear the digits you press. |

Requesting Payment Card Number

[Choose Payment Cards]

925 — Expose to Agent  [No Digits ▼]

Agent display  | Please enter your payment card number, followed by the pound sign. |

Requesting Expiration Date

Agent display  | Please enter the expiration date as a four digit number. For example, January 2029 would be entered 0 1 2 9. |

Requesting CVV

928 — ☐ CVV must be provided

Agent display  | Please enter the verification code form the back of the card, followed by the pound sign. |

Balance / Payment Amount

930 — ☐ Require payment amount verification

Agent display  | Your card will be charged in the amount of (read the amount below). Do you understand and agree? |

[CANCEL] [SUBMIT]

FIG. 9

Payment Collection Action

Scripting ◯ Automatic (Pre-recorded messages will play when prompting for user input)
● Manual (Agent will read scripts when prompting for user input)

| Data Collection | Timeouts / Attempts |

Users will have a number of seconds equal to the timeouts to input a valid response. Failure to do so will increment the attempts counter by 1 for that input. If the attempts counter for any input is exceeded, the call will terminate.

Requesting Payment Card Number
- Timeout (sec): 280
- Attempts: 3
- On invalid response, display: The card number provided is invalid.
- On wrong card type, display: The card provided is not an accepted type.

Requesting Expiration Date
- Timeout (sec): 220
- Attempts: 3
- On invalid response, display: The expiration date provided is invalid.
- On wrong card type, display: The card you have entered is expired.

Requesting CVV
- Timeout (sec): 220
- Attempts: 3
- On invalid response, display: The verification code entered is not valid.

Balance / Payment Amount
- Timeout (sec): 220
- Attempts: 3
- On confirmation, display: Payment amount confirmed. Thank you.
- On initial refusal, display: We just want to confirm that you do not accep
- Confirmed refusal, display: Cancelling payment selection.

Attempts Exceeded
- If attempts exceeded, display: Too many failed attempts. Canceling payment.

[ CANCEL ] [ SUBMIT ]

FIG. 10

PROVIDING IMPROVED CONTACT CENTER AGENT ASSISTANCE DURING A SECURE TRANSACTION INVOLVING AN INTERACTIVE VOICE RESPONSE UNIT

RELATED APPLICATIONS

This application is a continuation of U.S. patent application Ser. No. 15/628,938, filed on Jun. 21, 2017, entitled "Providing Improved Contact Center Agent Assistance During A Secure Transaction Involving An Interactive Voice Response Unit", the contents of which are incorporated by reference in its entirety.

FIELD OF THE DISCLOSURE

The concepts and technologies disclosed herein generally pertain to providing flexibility and assistance to a contact center agent while the agent is engaged in a transaction involving the conveyance of sensitive information from a remote party to an interactive voice response unit. The contact center agent is aware of the conveyance of sensitive information between the remote party and the interactive voice response unit but without being directly exposed to such sensitive information.

BACKGROUND OF THE INVENTION

Contact centers frequently receive calls from customers wishing to purchase an item or make a payment for a service rendered or goods purchased. A common form of making the payment involves conveying credit card information from the remote party. In the past, the remote party verbally indicated the card information to the agent, who would enter the information into a computer to process the transaction. This exposed the sensitive information of the credit card to the agent, and created a security weakness that allowed the potential for identify theft.

Past solutions attempted to automate the process by connecting the remote party with an interactive voice response unit ("IVR"). This allowed the remote party to enter their credit card using dual tone multiple frequency tones ("DTMF") by pressing the keys on their phone. If the agent is not bridged onto the call, then the agent would not hear this information. However, in some embodiments, the agent would be bridged onto the call to facilitate the transaction, and then the agent would be exposed to the credit card information, albeit in the form of DTMF tones.

One approach for handling a credit card transaction is disclosed in U.S. Pat. No. 6,862,343 ("Vacek"). In this scheme, the agent would connect the call to an IVR when the transaction occurs, but doing so offers limited ability for the agent to know the status of the transaction as it occurs. That is, the agent is not fully aware of when information is entered by the remote party and is unaware of the transaction status until the transaction is completed. Another approach is disclosed in U.S. Pat. No. 8,275,115 ("Everingham"), but similarly offers limited ability for the agent to know the status of the transaction as it occurs. Further, the agent is muted when the remote party interacts with the IVR, so that the agent cannot assist the remote party if difficulties arise during the transaction. For example, if the remote party asks a question while interacting with the IVR, the agent cannot answer the question. Another approach is detailed in U.S. Pat. No. 8,750,471, ("Tew") which defines a "safe mode" wherein DTMF tones provided by the remote party are blocked from the agent. This also offers limited ability for the agent to know the status of the transaction as it occurs. Furthermore, Tew describes an implementation for conventional telephone technologies, which is not applicable for a Voice over Internet Protocol ("VoIP") environment. As will be discussed below, DMTF tones are handled differently in a VoIP environment as opposed to a conventional telephony technology environment.

Furthermore, all these approaches offer limited flexibility as to how prompts are provided to the remote party. Typically, only one approach is defined, i.e., the prompts are provided by an IVR, and they do not provide a flexible configuration where prompts may be provided either by the agent or the IVR. Further, none of these approaches provide flexibility in the agent being able to control and monitor the status of the transaction as it happens without exposing the agent to the sensitive information.

Therefore, what is needed is an approach that provides flexibility as to configuring how the prompts are to be provided, without exposing the agent to the sensitive information in any form, and allowing the agent to control and monitor the progress of the transaction as it occurs. It is with these and other aspects in mind that the concepts and technologies herein are disclosed.

SUMMARY

Various embodiments are disclosed for providing increased flexibility and increased agent control in a contact center, while a secure transaction is occurring involving a remote party, without the agent being exposed to sensitive information. In one embodiment, a configuration parameter defines whether prompts will be provided by the agent or an IVR to the remote party. In another embodiment, the agent has enhanced control over the transaction while the transaction occurs, but still without being exposed to sensitive information provided by the remote party.

As is discussed in greater detail below, the subject matter disclosed herein may be implemented as a computer-controlled apparatus, a method, a computing system, or as an article of manufacture such as a tangible, non-transitory computer-readable storage medium. These and various other features will be apparent from the following Detailed Description and the associated drawings.

This Summary is provided to exemplify concepts at a high level that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIGS. 9-10 illustrate embodiments of configuration screens for configuring a secure payment transaction feature in a contact center.

DETAILED DESCRIPTION

Figure 1:
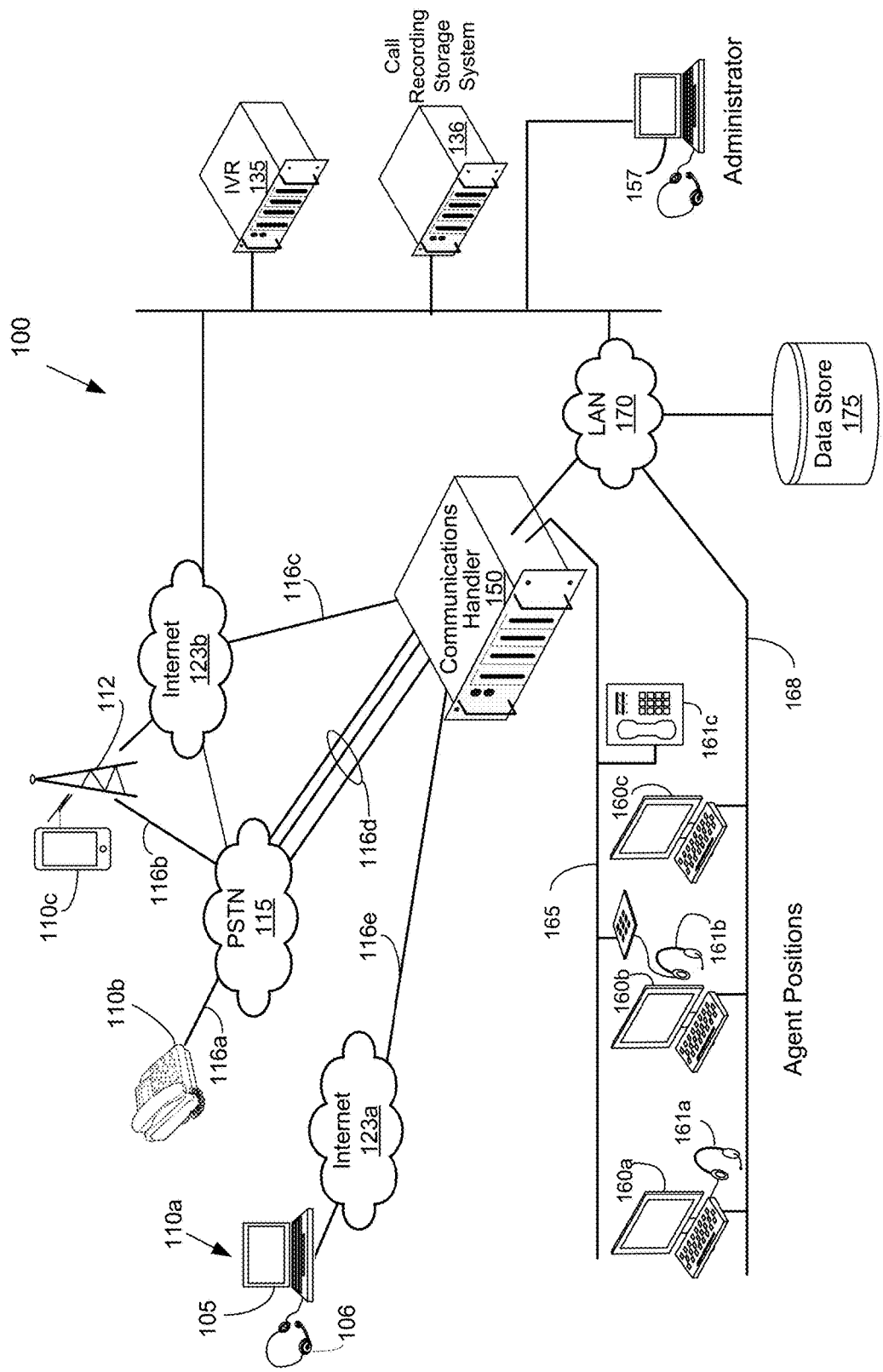
FIG. 1 illustrates one embodiment of a contact center architecture for processing a secure payment transaction involving a call with a remote party.

Contact centers frequently accept or originate calls from remote parties that need to conduct a payment transaction during the course of interaction with the contact center agent. The purpose of the payment may vary, but frequently involves making a payment for goods or services purchased or an installment payment on a debt. In many cases, a credit or debit card is used to effect the payment. This involves the remote party providing the card information, such as the account number, expiration date, and a card verification value ("CVV") (also sometimes referred to as a credit card value ("CCV"), security code, or similar terms). Providing this information by the remote party to the agent verbally exposes this information, referred to herein as sensitive financial information ("SFI"), to the agent. SFI is commonly used to accomplish identify theft by others, and hence there is general recognition that SFI should not be carelessly exposed by the card holder. Further, merchants are desirous to avoid facilitating any occurrences of identity theft, and hence try to preclude any such accidental or deliberate exposure of SFI to agents.

Rather than verbally stating the SFI to the agent, a common technology in the form of interactive voice response ("IVR") units are used. IVRs can play a pre-recorded prompt and accept responses in the form of speech or dual-tone multiple frequency ("DTMF") tones. DTMF tones are the tones (audible indications) generated when a user presses the keypads on a telephone. These comprise the digits 0-9 and the asterisk ("*") and octothorpe or pound ("#") symbols. By having the remote party interact with an IVR and providing the SFI using DTMF tones, the information is not as readily exposed for nefarious uses.

However, with the increasing occurrence of identity theft, even the exposure of DTMF information to an agent can be problematic. The sounds of the DTMF tones during a credit card transaction can be easily recorded and subsequently decoded, and anecdotal stories report that some agents are even capable of mentally decoding DTMF tones to their corresponding numerical values.

Thus, approaches have been defined to isolate the remote party's interaction with the IVR from the agent during a secure payment transaction. Typically, the remote party is speaking with an agent, and the need arises for the remote party to make a payment. The agent will then bridge on the IVR so that the party can provide the SFI as prompted by the IVR. During this process, the agent is muted, so that the agent cannot hear the interaction, including any DTMF tones. However, this has the disadvantage that the agent is unable to monitor the progress of the interaction. Furthermore, the agent cannot answer any questions that the party may have. For example, the party may ask whether a certain type of credit card will be acceptable, and would like to know the answer before attempting the payment. Or, the remote party may ask in the middle of transaction if they can use a different credit card. In some cases, the agent is unable to hear any questions the party may ask and the IVR will disregard such questions.

In some cases, it would be preferable for the agent to verbally provide the prompts to the remote party, so that the overall customer experience is seamless. However, the responses from the remote party, whether in the form of speech or DTMF tones, need to be shielded from the agent. This presents a challenge, because certain type of audio from the party (i.e., questions) need to be provided to the agent, while other types of audio (i.e. DTMF responses) need to be shielded or suppressed from the agent.

Prior solutions addressing this issue focused on doing so in a conventional, telephony environment. Such solutions focused on filtering out DTMF tones embedded in analog or digital telephony facilities. However, such solutions are not well suited for modern communication systems, which utilized voice over internet protocol ("VoIP") which frequently involves a session initiated protocol ("SIP") for controlling the conveyance of audio information on channels. Thus, prior art solutions which were not geared for an internet protocol ("IP") technology are not readily applicable or they do not utilize the flexibility that is possible in a VoIP environment. As will be seen, the technology defined herein is distinguishable from how conventional analog or digital telephony systems handle DTMF information.

Overview of the Secure Payment Transaction Process

A secure payment transaction as used herein refers to a transaction involving an agent working for a contact center operator handling a voice call with a remote party for purposes of effecting a payment. The agent may be physically located at a contact center, or may be working from a remote location. The process typically begins at a point during a call, between an agent and a remote party, when the remote party agrees to make a payment. Although the examples herein are illustrated by the user paying by credit card, other financial instruments could be used, such as gift cards, debit cards, store credit cards, gift cards, check cards, checks, etc. Further, other forms of electronic funds transfer methods could be used with the concepts and technologies disclosed herein, which do not involve a physical card. Rather, these methods involve entering various type of account codes and other financial identifiers. The automated clearing house ("ACH") method requires providing appropriate account identifiers and/or bank routing numbers from which payments may be drawn from. Thus, reference to the secure payment transaction as involving a credit card is not intended to limitation application of the concepts herein to only credit cards. In fact, any type of sensitive information could be protected using the concepts herein, even if the information is not used for a purchase transaction, but a more general secure transaction of some form, such as conveying health care, other financial information, access codes, etc.

The agent will initiate the secure payment agent assist ("SPAA") transaction, which causes the agent's computer to presenting the agent with a pop-up window. This pop-up window will inform and assist the agent through the process. Hence, the feature described herein is the secure payment agent assist ("SPAA") function, and when applied to assisting the agent in a payment transaction, the transaction can be also referred to as a SPAA transaction. The SPAA may be invoked by the agent in various ways, including a keystroke entry, a selection of an icon on their computer screen, selection of a pull down menu option, etc. However, the agent may invoke the SPAA transaction, the result in one embodiment is that a SPAA pop-up window is presented to the agent.

In addition, the pop-up window will present various functions that the agent may invoke during the SPAA process. Invoking the secure payment process will cause the IVR to be added to the call. This may be accomplished by invoking a conferencing-type function or a special transfer-type function. At this point, the remote party is provided a prompt. In one embodiment, the contact center components are configures to that the prompts are provided by the agent speaking. If so, the agent is presented on the pop-up window with the text of the script that the agent is to speak to the remote party. In another embodiment, the prompts are provided by the IVR. These may be recorded in the agent's voice, or may be in another voice. If so, there is no need to present the text of the script to the agent. If prompts are provided by the IVR, the agent may or may not be able to hear the IVR prompt.

In response to the prompt, the remote party typically presses one or more keypads on their phone, causing DTMF tones to be generated. These DTMF tones will be converted to messages, and provided to the IVR. Specifically, the agent will not receive these messages, nor will any audio of the DTMF tones be provided to the agent's headset.

Contact Center Environment

Many modern contact centers utilize VoIP technology, which alters how various components are deployed and interact. Once such illustrative contact center architecture that may be used in accordance with the various technologies and concepts disclosed herein and that is based on processing VoIP based calls is shown in FIG. 1.

The contact center 100 shown in FIG. 1 may process voice calls and non-voice communications that are inbound-only, outbound-only, or a combination of both (sometimes referred to as a "blended" contact center). For purposes of illustrating concepts associated with secure payment processing, the illustration will focus on outgoing telephone calls, but the concepts equally apply for incoming calls. Thus, in the following description where calls are described as "originating to" certain called parties/devices, the description could have just as easily described the calls as having "originated from" the same parties/devices.

The term "telephone call" as used herein is generally synonymous with a "voice call" unless indicated otherwise and is intended to apply to any of the common technologies used. Thus, the term "telephone call" may encompass a voice call using any form of currently available technology and directed to any type of telephone device, such as a soft phone 110a, a conventional telephone 110b, a mobile or smart phone 110c, or other device known in the art. This also encompasses various telephony oriented protocols and signaling mechanisms. The term "call" as used herein may encompass an active instance of a voice wo-way communication, an attempt to establish two-way communication, or a portion of the two-way communication.

In various embodiments, the communications handler 150 may originate outbound calls. Specifically, the communications handler may be a dialer, such as a predictive dialer, which originates calls and connects an available agent to the call. Depending on the embodiment, outbound voice calls may originate to called parties using a variety of different phone types. For instance, a called party may receive a call at a conventional analog telephone 110b connected to a public switched telephone network ("PSTN") 115 using an analog plain old telephone service ("POTS") line 116a. The calls may be routed by the PSTN 115 and may comprise various types of facilities 116d protocols, and technologies, including, but not limited to: T1 trunks, SONET based fiber optic networks, ATM networks, etc. Various types of routers, switches, bridges, gateways, and other types of equipment may be involved in the processing of the calls.

Outbound voice calls may also originate to a mobile phone device 110c, such as a smart phone, tablet, or other mobile device, which wirelessly communicates with a mobile service provider ("MSP") 112. The voice calls may be routed to the PSTN 115 by the communications handler 150 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols, such as SIP or H.323 protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology, but could refer various VoIP communication channels.

Outbound voice calls may also originate to or from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of Internet Protocols ("IP") and facilities may be used to convey voice calls.

In various embodiments, outbound calls from calling parties to the contact center may originate from the communications handler 150, which could be, in one embodiment, a predictive dialer. The communications handler 150 may connect an outgoing call (or more specifically, a call leg) over contact center facilities 165 to a phone device used by an available agent. Depending on the embodiment, the facilities 165 may be any suitable technology for conveying the call, including but not limited to a local area network ("LAN") 170, wide area network ("WAN"), ISDN, or conventional TDM circuits. In addition, the facilities 165 may be the same or different from the facilities used to transport the call to the communications handler 150.

A portion of the call may be referred to as a "call leg" existing between the caller and certain equipment, or between two pieces of equipment. A call may comprise a number of concatenated or joined call legs, which may involve various components at their end-points, as known to those skilled in the art. A call leg may also be unidirectional or bidirectional with respect to the ability to convey speech. Thus, the predictive dialer may originate a call leg to a called party and join that call leg to one established with an agent's telephone, thereby forming the overall call. For example, the dialer may connect another component (such as the IVR 135) using a unidirectional or bidirectional call leg. Call legs may be bridged, joined, and/or conferenced together, allowing various entities to communicate. For example, a unidirectional call leg from the communications handler to the call storage component 136 may be established, so that a recording of the call is maintained. In various embodiments, the call may record only the audio heard by the agent, so that SFI is not inadvertently captured in the call recording, which may expose the SFI for nefarious uses.

In various embodiments, a call leg may be routed over facilities 165 to an agent for speaking with the called party. The physical area at which the agent sits is often referred to as an agent "position" and these positions are often grouped into clusters managed by a supervisor, who may monitor calls and the agents' productivity. An agent typically uses a specially configured computing device 160a-160c, such as a computer with a display, and a voice device 161a-161c that is adapted for various contact center functions associated with processing communications. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position. The workstation typically has a display, typically provided via a computer monitor. This is used to convey information to the agent about the calls, and where the agent can enter information, such as disposition information. The agent may interact with the communications handler using a mouse or other pointing device in conjunction with their computer display. Disposition information may comprise entering a code or other information indicating the outcome of a call.

In particular embodiments, the voice device 161a-161c used by an agent may be a soft phone device exemplified by a headset 161a connected to the computer 160a. The soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

Agents typically log onto their workstations 160a prior to handling calls. The workstation may also communicate this login information to the communications handler 150. This allows the contact center (including the communications handler) to know which agents are available for handling calls. Thus, after originating a first outbound call leg for a call, the communications handler will ascertain which of the agent is available to handle the call, and may create a second call leg to the available agent and then join the two call legs, thereby forming the call. In some embodiments where the communications handler is a predictive dialer, the predictive dialer will wait until the first outbound call leg is answered or answered by a live person, and then will immediately join the call leg to the selected agent with the call.

Depending on the embodiment, the interaction between the various components shown may involve using a local area network ("LAN") 170. However, other configurations are possible, such as, but not limited to, using a wide area network, wireless network, router, bridge, direct point-to-point links, etc. Thus, in lieu of facility 165 for conveying audio to the agents, the facilities associated with the LAN 170 may be used.

In various embodiments, the communications handler 150 is typically configured to dial a list comprising call records (and further comprising telephone numbers) to initiate outbound calls. This list, and other related information, may be maintained in the data store 175. In some embodiments, the communications handler 150 may be embodied as a modified private automatic branch exchange ("PBX" or "PABX"). Further, in other embodiments, the communications handler 150 may directly interface with voice trunks using facilities 116c, 116d, and 116e to the PSTN 115 and/or Internet providers 123a, 123b for originating calls. After the calls are originated, a transfer operation by the communications handler 150 may connect the call with an agent or place the call in a queue. In various embodiments, the communications handler 150 may make use of one or more algorithms to determine how and when to dial a list of numbers so as to minimize the likelihood of a called party being placed in a queue while maintaining target agent utilization.

The communications handler 150 may also joint or otherwise involve an IVR 135 with the call, after it is established. The IVR may provide recorded prompts to the remote party, and the remote party may respond by providing DTMF tones. As will be discussed below, the IVR may receive the DTMF tones themselves or digital messages (not audible signals) corresponding to the DTMF tones and conveying the information thereof. If the IVR incorporates speech analytics, the IVR may accept speech from the remote party. Thus, for a transaction involving a credit card, the IVR may prompt the remote party for the card number, which the remote party responds with the appropriate DTMF tones. Next, the IVR may prompt the remote party for an expiration date and the security code. The IVR may also confirm the amount to be charged and the remote party may confirm the amount. The IVR may or may not receive the DTMF tones as digitized analog audio signals. In many embodiments, the IVR received the DTMF tones in the form of digital messages, which have been converted from the in-band audio information by other components in the carrier or in the contact center.

An administrator computer 157 may be used by the administrator to perform the configuration and administration of the IVR component, the communications handler, the LAN, and other components in the contact center. The administrator may have access to various data structures (as discussed herein) and can configure the IVR and communications handler to perform various types of payment processing functions as discussed herein.

Although a number of the above components may be referred to as a "component," each may be also referred to in the art as a "computing device," "processing system", "unit", "server", or "system" A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 150 or other component may be combined into a single hardware platform executing one or more software modules. In addition, the contact center architecture 100 may be provided as a hosted solution, where the call processing functionality is provided as a communication service (a so-called "communication-as-a-service" or "CaaS") to a contact center operator. Thus, there is no requirement that the servers identified above actually be located or controlled by a contact center operator.

In addition, depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Those skilled in art will recognize FIG. 1 represents one possible configuration of a contact center architecture 100, and that variations are possible with respect to the protocols, facilities, components, technologies, and equipment used. For example, various algorithms and queuing arrangements may be defined to efficiently process and/or place calls.

Treatment of DTMF

The remote party interacts with the IVR during a secure payment transaction by indicating SFI via DTMF. Thus, how DTMF is conveyed and processed in the various contexts is critical. The approach used in a VoIP context for conveying DTMF information is fundamentally different from how this is accomplished in a conventional PSTN environment. For purposes herein, "DTMF" by itself refers to specific tones. The phrase "DTMF information" refers to the information conveyed by DTMF tones, which may be via audible tones, representations of the tone, or of digital messages conveying information associated with the tones. The information conveyed by pressing the corresponding key on the keypad on the phone device are the digits 0-9, the asterisk ("*") and pound sign, hashtag, or octothorpe symbol ("#") as it may be variously referred to. Thus, the DTMF information may also be referred to herein as the keypad information.

DTMF tones were originally defined as a way to signal telephone numbers during call setup, but could also be used to convey numerical information end-to-end after the call was established. The DTMF tones were conveyed on the audio channel, along with speech. Thus, conventionally speech audio and DTMF tones (or DTMF audio) are "mixed" together in-band and conveyed from the originating party to the destination party on the same audio channel. This required the use of tone decoders, and later digital signal processing equipment, to detect and extract the information. During call setup (e.g., making a telephone call), DMTF was expected by the telecommunication switches, and voice audio was not. However, once the call was established, voice audio was normally conveyed by the audio channel, and the switches did not look for DTMF tones. DTMF tones would only then be used to signal to the remote system connected to the call. Of course, if the call was connected to an IVR, the IVR would expect DTMF tones to be conveyed in response to a prompt.

With the introduction of digital technologies, DTMF tones were still conveyed as audio, mixed with speech, albeit in digitized form. They were still integrated with speech. Thus, DTMF tones were merely digitized, as opposed to conveyed as analog signals. Thus, DTMF tones are conveyed end-to-end on the audio path, even in a digitized telephony network. With the advent of ISDN in the telephony network and out-of-band signaling, it became possible to send information out-of-band, e.g., as a digital message separate from the audio.

In a VoIP environment, the treatment of DTMF information is different from conventional telephony. Recall that the purpose of sending DTMF tones once a call is established is to signal information to the remote processing system, such as an IVR. Since the consumer of this information is ultimately a computing system, which is better suited to processing digital messages as opposed to digitized analog signals (which would have to be converted by the IVR into a digital message first), it was determined by industry organizations that it would be beneficial to segregate DTMF information from audio speech at some point. This typically would occur at the point of interworking between conventional telephony systems and VoIP systems. Doing so could have the benefit of avoiding the IVR computing equipment from having to recognize these in-band tones.

Figure 2:
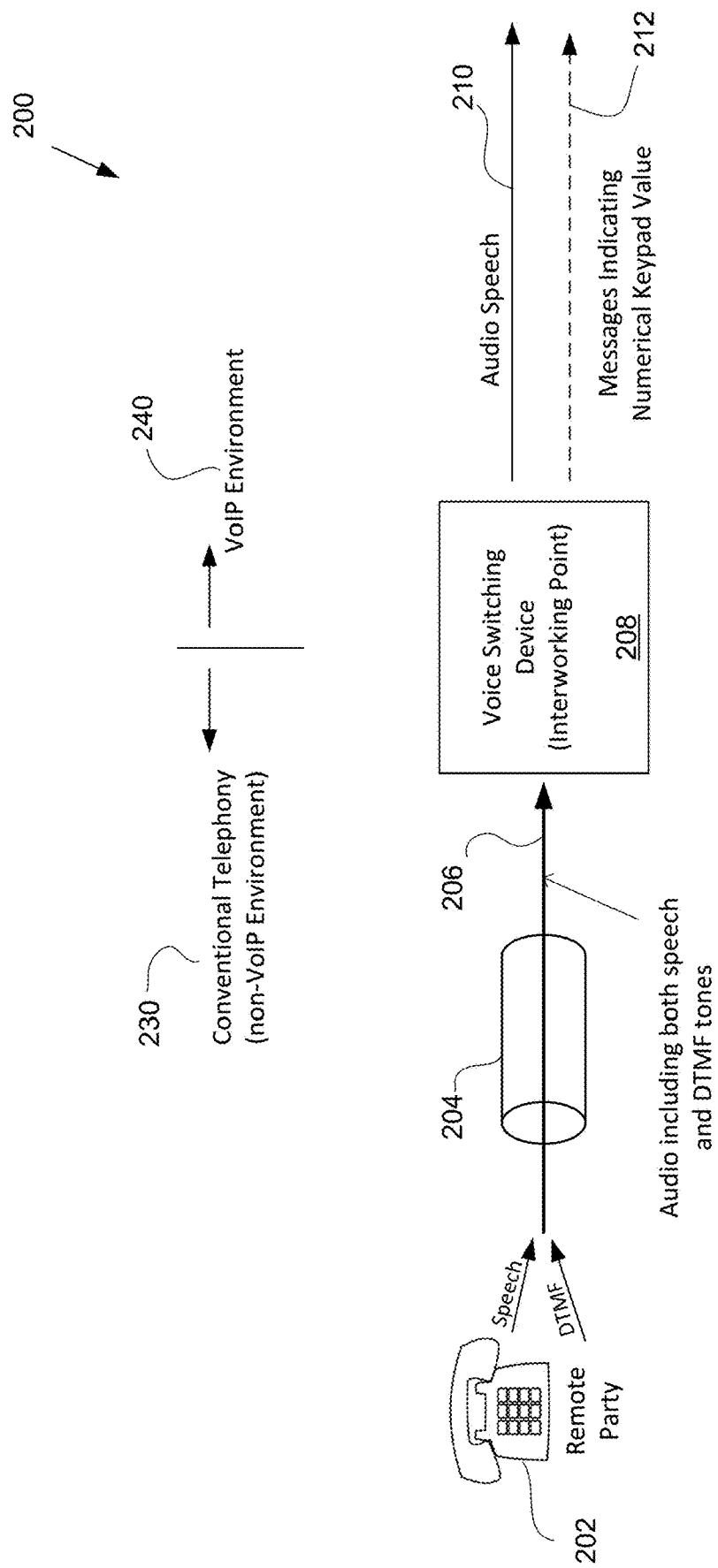
FIG. 2 illustrates conceptually how DTMF information is interworked from a non-VoIP environment to a VoIP environment.

Turning to FIG. 2, one environment for converting DTMF tones to out-of-band VoIP type signaling is shown. This processing environment 200 is depicted as one portion 230 which is based on conventional telephony, i.e., a non-VoIP environment. The non-VoIP environment may encompass conventional digital TDMA technology, ISDN technology, ATM, T1, or other digital/analog telephony technologies. The other portion 240 is depicted as a VoIP based environment, which may be based on various IP standards, such as SIP or H.323, etc. An interworking device, in the form of a voice switching device 208, is shown that interworks the two separate environments.

A conventional telephone 202 is shown which can generate audio comprising speech from the party and DTMF tones originated when the user presses the keypad. As stated before, there is a one-to-one correlation between the DTMF tone generated and the corresponding symbol on the keypad, such the DTMF tones convey information representing the numbers 0-9, the * and #symbols. These analog signals are conveyed over a facility 204, which may be copper wires or fiber, such that the audio channel 206 conveys both speech audio and DTMF tone audio.

Once the DTMF audio is received at the voice switching device 208, a conversion may be performed whereby the speech audio is segregated from the DTMF tone audio. There, the speech audio is converted to a suitable VoIP packet protocol and transmitted on a channel 210 as speech only. The DTMF tones are converted to digital messages 212 representing the keypad information that is separated from the speech audio. In this diagram (as in others), the dotted line 212 represents digital message information whereas the solid line 210 represents speech audio. Both may be in digital form. Thus, in most instances, the speech audio 210 is intended for delivery to a human end user and the messages 212 are intended for processing by a computer. (In the context of speech analytics, the audio may be, in fact, processed by a computer.) The segregation of the DTMF tones from the audio at the interworking point may not be perfect, and sometimes DTMF tones remain in the speech audio. Such a condition is sometimes referred to as "bleed through", which represents the DTMF tones "bleeding" through on the speech audio. In various embodiments, the phone may be connected to an adapter which performs the conversion described herein, or other devices in the communication path may perform this conversion of the DTMF tones.

The Internet Engineering Task Force ("IETF") has defined various ways in which DTMF information may be interworked between a VoIP and non-VoIP environment. The above diagram represents one approach. Further information about this may be found in, e.g., U.S. Pat. No. 8,831,204, and the IETF's Request for Comments ("RFC") 4733, 2976, 6086, 2833, and 4730, the contents of which are incorporated by reference for all that it teaches as background information as to how DTMF may be converted to out-of-band information in a VoIP environment.

Figure 3:
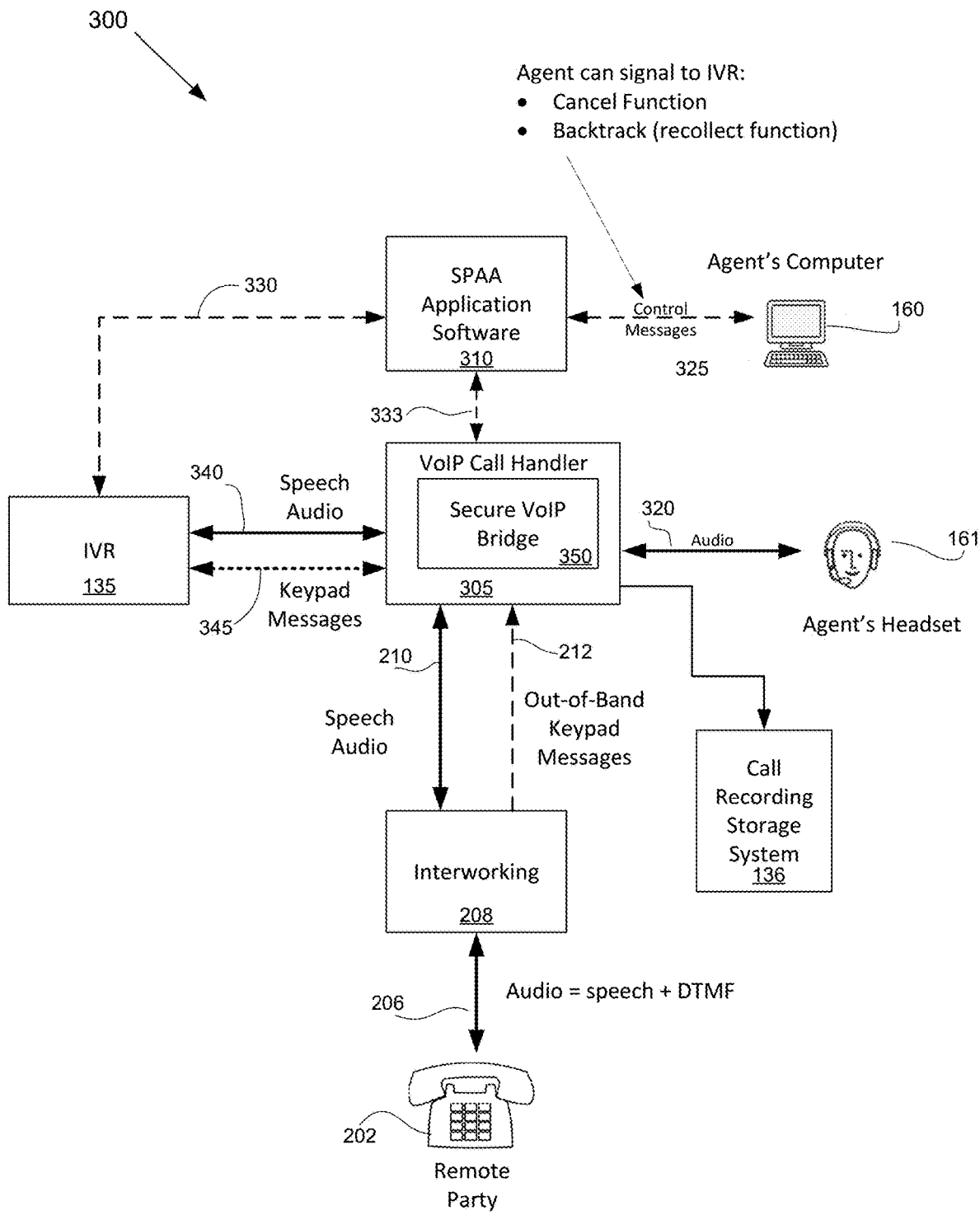
FIG. 3 illustrates one embodiment of contact center components involved in processing a secure payment transaction while ensuring the agent is not exposed to sensitive information.

FIG. 3 illustrates how using this approach for segregating DTMF information once a VoIP environment is reached can be used for a secure payment transaction in a contact center. Turning to FIG. 3, the system 300 comprises four main elements—the interworking component 208, the VoIP call handler 305, the IVR 135, and the secure payment agent assist ("SPAA") application software 310.

Interworking Component

Starting with the interworking component 208 first, this was discussed in FIG. 2, and provides function of segregating out the DTMF information into an out-of-band message conveying the corresponding keypad information. Specifically, a conventional telephone 202 may originate audio 206 that includes speech and DTMF tones. At the interworking unit 208, it will convert the speech audio to a VoIP based speech audio 210 and an out-of-band keypad message 212. As with FIG. 2, the dotted lines 212 represent messages and the solid lines 210 represent speech audio. In many embodiments, this functionality exists outside of the contact center, so that the contact center receives the out-of-band keypad information. However, it is possible that the function could be performed in the contact center, which is possible if the contact center is VoIP based but is interface with non-VoIP trunks or facilities.

VoIP Call Handler

The VoIP call handler 305 is part of the communications handler 150 of FIG. 1. The communications handler may have a variety of interfaces and capabilities, one of which may be the VoIP call handler 305, which includes a secure VoIP bridge 350 used in during a secure payment transaction. The VoIP call handler 305 is able to establish and receive calls using VoIP, bridge on VoIP-based call legs to a call, etc. Once a typical secure payment transaction occurs, the VoIP call handler will have a VoIP-based call leg 210 conveying the audio to/from the remote party's phone 202 (via the interworking unit 208 and other carrier facilities), another VoIP-based call leg 320 conveying audio to/from the agent's headset 161, and another VoIP-based call leg to the IVR 135. Although the figure shows these as bidirectional, they are typically implemented in VoIP as two unidirectional audio paths. However, those skilled in the art will recognize that it is common to depict these as a single line for convenience. Further, at various times as will be discussed, some of the call legs may be modified so that one of the unidirectional call legs are muted or interrupted at selective times. This allows certain entities to selectively hear (or only speak) to the VoIP call handler at selective times. Thus, the information presented to the agent can be selectively controlled, as will be seen.

The VoIP call handler 305 may receive and originate signaling messages. For example, the VoIP call handler may receive SIP-based messages (or using other types of messages) conveying the keypad messages 212. Further information about the structure of these messages may be found in the aforementioned RFC documents developed by the IETF. The VoIP call handler 305 may also interact with the IVR via signaling messages 345 conveying the received keypad information from the remote party. Other signaling messages, such as SIP messages between the VoIP call handler 305 and the IVR 135 may be used to manage the audio channel 340. The VoIP call handler may also communicate with the SPAA application software 310, which contains an application program for managing and assisting the agent during the secure payment transaction.

The purpose of the VoIP call handler, which comprises the secure VoIP bridge 350, is largely to manage the call legs of the call involving the remote party, the agent, and the IVR. During the call between the remote party and the agent, the IVR may be bridged onto the call to effect the secure payment transaction. In various embodiments, the IVR may be bridged by conferencing in the IVR, or transferring the call to the IVR. Various methods can be used for accomplishing the bridging the call legs. Typically, the process is initiated by the agent via their computer 160.

The VoIP call handler, via the secure VoIP bridge 350, also controls which audio at a given input to the VoIP call handler 305 is provided to the other components, and at what times (both before and during the payment transaction), based on how the secure payment transaction is configured. As will be discussed, in various embodiments the audio from one party (e.g., the agent or remote party) may or may not be provided to another party (the IVR or agent) or vice versa. In addition to handling the audio comprising speech, the secure VoIP bridge 350 also handles the dissemination of keypad information received in the out-of-band messages 212. In this case, out-of-band keypad messages 212 received from the remote party may be provided as keypad messages 345 to the IVR and/or via a signaling link 333 to the SPAA. The secure VoIP bridge may also convert the keypad messages to aural indications provided over the audio channel 320 to the agent's headset. However, these aural indications are designed to mask the information conveyed. That is, each received keypad message may result in a "click" or other similar sound provided to the agent. In this way, the agent knows that the remote party entered a digit via the keypad on their phone, but the agent is not aware of which keypad (i.e., digit) was indicated. In other embodiments, the click may be a buzz, pop, or other type of sound. Thus, the VoIP call handler 305 includes functionality for controlling audio and message dissemination, which information is being selectively copied, blocked, or converted at various times and in various configurations.

IVR

The IVR 135 may be configured to provide the prompts to the remote party during a payment transaction. As will be seen, in another configuration the agent, not the IVR, may be providing the prompts to the remote party. Assuming that the IVR is providing the prompts, it will store and play a sequence of prompts to the remote party, typically requesting, e.g., a credit card number, an expiration date, and a CVV code. This is provided by the IVR over the audio channel on the call leg 340, which the VoIP call handler then provides to the remote party on call leg 210. In various embodiments, the agent may also hear the prompts. The prompts themselves do not convey sensitive information, but the responses by the remote party do.

The IVR will also receive information comprising the response to the prompts. This is typically signaled by the remote party depressing the keypad to indicate a numerical value in response to the prompt. For example, the IVR may prompt the party for a credit card account number, which the remote party responds by pressing the appropriate keys on their phone to convey the corresponding information. This information is received by the VoIP call handler and provided to the IVR as keypad messages 345. In alternative embodiments, the IVR may receive the keypad information via signaling link 330 from the SPAA application 310.

The embodiment shown in FIG. 3 illustrates the SPAA 310 as distinct from the IVR 135. It should be recognized that in various embodiments, the SPAA may be integrated and part of the IVR. In other embodiments, the SPAA may be integrated with the VoIP call handler. Finally, in other embodiments, the IVR, SPAA and VoIP call handler can all be integrated. Those skilled in the art will recognized the functions and interactions between these components may be altered in various ways.

SPAA Application Module

The SPAA application module 310 is shown in FIG. 3 as separate from the VoIP call handler 350, but may be part of the communications handler 150 in some embodiments. It is shown a separate from the VoIP call handler, but that is for illustrative purposes; in various embodiments the SPAA may be a separate module executing in the same processing system as the VoIP call handler. The depiction in FIG. 3 is not intended to limit any embodiments of practicing the concepts of technologies disclosed herein.

The SPAA 310 at a high level coordinates the operation of the other components, namely the VoIP call handler 350, the IVR 135, and the agent's workstation computer 160. While each of these components may operate and perform some functions autonomously, they also communicate information with the SPAA, which is required for it to coordinate operation. For example, the SPAA receives the initial indication from the agent's computer that a secure payment transaction is to begin. The SPAA 310 may ensure that the configuration parameters are used as defined for the particular secure payment transaction. The SPAA may further ensure that a secure VoIP bridge is available to process the transaction when the agent requests. This includes ensuring that available licenses are available for the user, if applicable.

If all necessary resources are available, then the SPAA 310 will confirm to the agent that the process will continue. This causes the SPAA to modify the display of the agent's computer as the transaction is initiated and continues. Further, the SPAA will coordinate involvement of the IVR on the call and update information to the agent's display based on the progress reported by the IVR.

During the secure payment transaction, the SPAA 310 will facilitate updating of the agent's display as needed during the various steps that may occur during the secure payment transaction. The SPAA may receive commands from the agent during the transaction, which alter the processing of the transaction. For example, a payment transaction may be controlled by the agent indicating a "recollect" command during the transaction. The recollect function has the impact of "backtracking" to an earlier prompt that was presented to the user and essentially restarting the collection of SFI data at that point during the transaction. For example, a party may start the process by entering the account of one credit card number but then decides after entry to use a different credit card. The agent could "recollect" the credit card information by effectively cancelling the current entered card information and starting the process over again. Or, the remote party may instruct the agent to cancel the entire transaction. Once the transaction is completed, the SPAA ensures that the process completes in a coordinated manner.

Secure VoIP Bridge

The secure VoIP bridge 350 provides a secure mechanism for disseminating speech audio and DTMF information between the IVR and the remote party, the agent's headset, and the SPAA. The secure VoIP bridge fundamentally processes speech audio from the remote party distinctly from DTMF information. By doing so, it provides additional flexibility in allowing the SPAA to provide agent assistance during the secure payment transaction, all the while ensuring the SFI is not exposed to the agent or to the call recording system.

Figure 4:
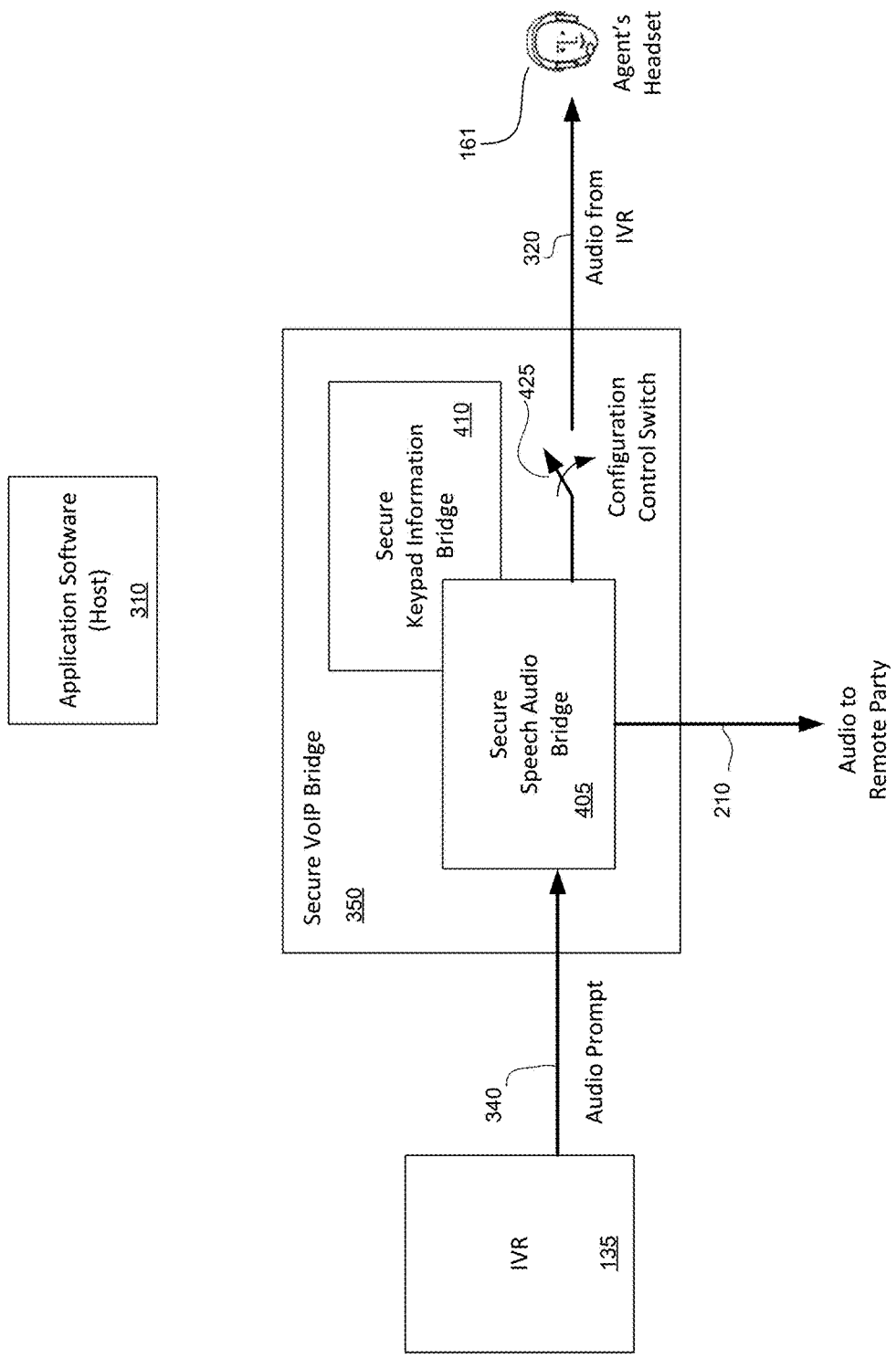
FIG. 4 illustrates one embodiment of a secure payment VoIP bridge for conveying audio information.

Turning to FIG. 4, a modular representation of the secure VoIP bridge 350 is shown comprising a secure speech audio bridge 405 and a secure keypad information bridge 410. Although this illustrates these modules as being separate, other embodiments may utilize an integrated architecture. A variety of technologies may be utilized by those skilled in the art to perform the necessary functions and concepts for ensuring the information is disseminated in a secure manner.

The secure speech audio bridge 405 processes speech audio. This may be speech of a live person (either the remote party or the agent) or a recorded announcement (e.g., a prompt from the IVR). The secure speech audio bridge 405 provides the audio to/from the IVR, remote party, and the agent, as the circumstances dictate. Because no speech audio is provided from the secure VoIP bridge to the SPAA, no line is shown between the two. In various circumstances, speech audio to/from these entities may be limited to unidirectional, bidirectional, or may be muted at various times. These aspects are configurable and may be controlled by the IVR or the SPAA, and may further depend on which particular step is being processed during the secure payment transaction.

The audio 340, 210, and 320 depicts audio emanating from the IVR and being provided to the remote party and the agent. This illustrates the operation of the secure speech audio bridge when the IVR is providing a voice prompt to the remote party. For example, the IVR may initially prompt the remote party for a credit card number. By providing a copy of the audio to the agent during this step, the agent is aware of the progress of the transaction. Further, because no SFI is being transmitted when the IVR makes the request, the agent (and the call recording system, which is not shown in FIG. 4) is not being exposed to SFI. The call recording system has a VoIP call leg established to it from the VoIP call handler. Although other embodiments may utilize other types of communication technologies for establishing the call legs between the various entities disclosed herein (such as TDMA, T1, ISDN, proprietary protocols, etc.), using a VoIP-based technology for the call leg is consistent with the technology typically used by contact center components. The VoIP call leg may be based on a SIP, Media Gate Control Protocol (MGCP), Real-time Transport protocol (RTP), Real-time Transport Control Protocol (RTCP), Secure Real-time Transport protocol (SRTP), Session Description Protocol (SDP), Gateway Control Protocol (Megaco, H.248), or some other IP type of protocol. Communication established using these VoIP based protocols are considered as being various examples of VoIP call legs.

A switch 425 is shown that can be dynamically opened and closed. This illustrates the functional ability to mute audio to the agent. Though shown as a switch, other technologies may actually be used. In order for the agent to hear the prompt, the switch 425 would have to be closed. If open, then the agent will not hear any audio (regardless of the source of the audio). In the above example, this switch 425 could be closed when the IVR provides a prompt, thus allowing the agent to hear the prompt, but opened if the remote party speaks. This may be used as such if the IVR incorporates a speech analytics module for recognizing answers from the remote party to a prompt. The switch could be controlled by the IVR 135 or the SPAA 310 as needed.

Figure 5:
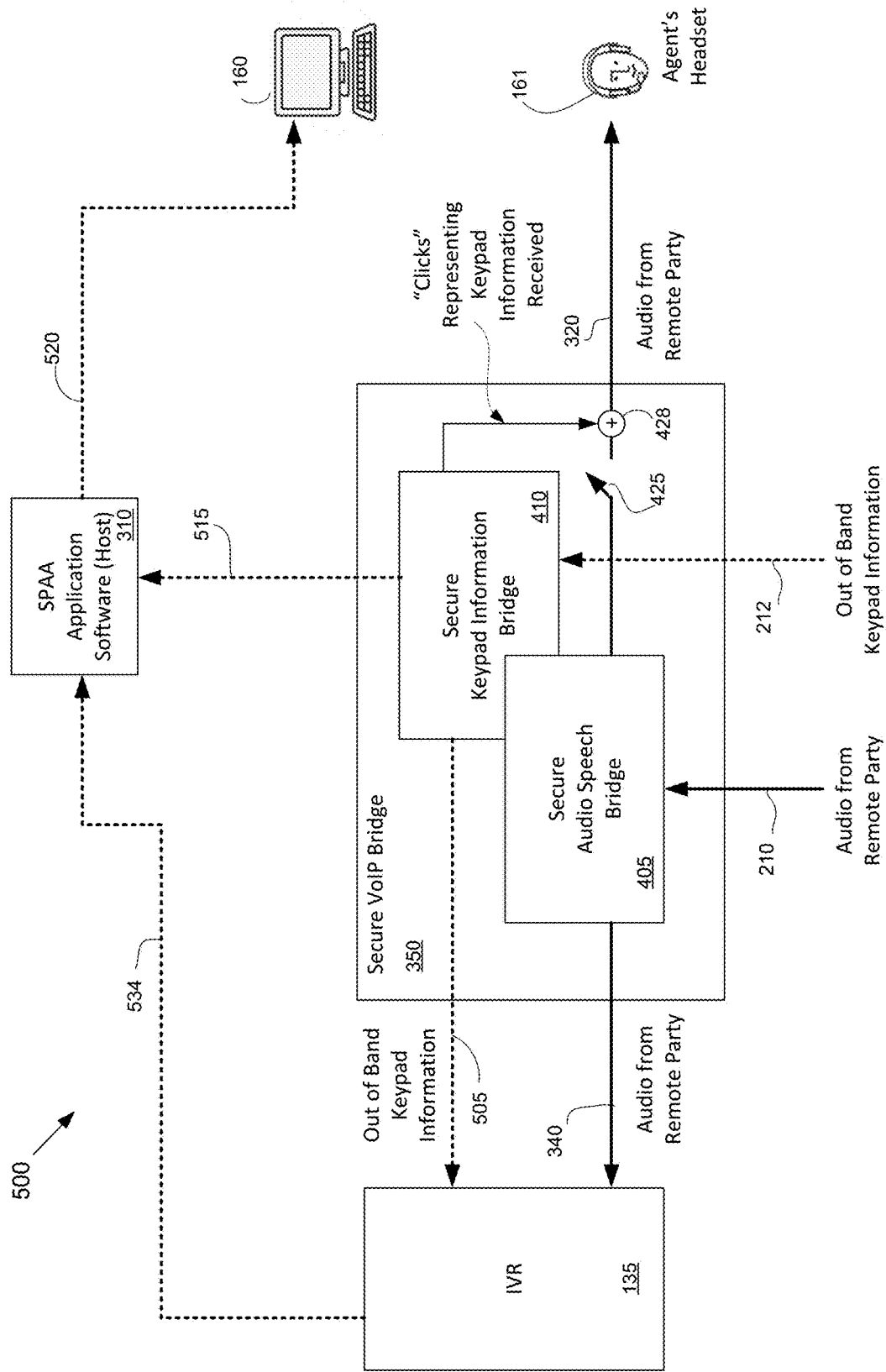
FIG. 5 illustrates one another embodiment of a secure payment VoIP bridge for conveying audio and keypad information from the remote party during the transaction.

Turning to FIG. 5, a system view 500 of the secure VoIP bridge 350 is shown that illustrates its use when the remote party is responding to a prompt. In some embodiments, the IVR may incorporate a speech analytics component, which can recognize the semantics of spoken speech. In such embodiments, the IVR may prompt the remote party to "Say or enter your credit card number." Thus, the remote party may respond with speech or DTMF.

If the remote party does respond with speech, the audio from the remote party 210 is received at the secure audio speech bridge 405 and provided as audio 340 to the IVR 135. The secure audio speech bridge also has a VoIP-based call leg 320 to the agent's headset. However, if the SFI is spoken by the party in response to the prompt, then the switch 425 will be opened at this point. Thus, the agent will not hear any spoken SFI from the remote party.

In many embodiments, the IVR prompts the remote party to enter their payment information using their keypad on their phone, which results in the party originating DTMF tones. Thus, no SFI is expected to be provided via audio. In this configuration, it is not necessary to provide any audio 340 from the remote party to the IVR by the secure audio bridge 405. It is also not necessary to provide the speech audio 320 to the agent, but because there is not SFI being spoken, there is no risk of exposing SFI to the agent. Thus, the switch 425 may remain closed. There is a benefit of providing the audio from the remote party to the agent, because the agent will hear if the party has any questions or difficulties.

Assuming the party responds to an IVR prompt by entering keypad information, then such DTMF information is received as out-of-band keypad information 212. The information is relayed by the secure keypad information bridge 410 as out-of-band keypad information 505 to the IVR. The message format may be altered during this process, but the information is maintained between the secure keypad information bridge 410 and the IVR 135. Similarly, the DTMF information may be sent by the secure keypad information bridge 410 to the SPAA 310. In this way, the SPAA is able to coordinate and monitor the progress of the secure payment transaction. In other embodiments, the IVR may provide the DTMF information via link 534 to the SPAA 310. In either approach, the SPAA 310 is aware of the keypad information provided by the remote party by receiving a message, not by receiving DTMF tone signals.

The secure keypad information bridge 410 also performs another function upon receiving keypad information 212 from the remote party. It will generate a generic audible indication, ("GAI") which is added to the audio output 320 that is provided to the agent. The GAI is an aural indication provided to the agent indicating that information has been received without indicating the information itself. It is a corresponding aural form of the GVI, so to speak. The provision of the GAI may be accomplished using an audio bridge 428 that allows the GAI audio to be added to the audio channel 320. When this occurs, switch 425 is opened, so that the audio indication, typically in the form of a "clicking" sound, is not provided back to the remote party or the IVR. Although an audible "click" or other form of a GAI may be provided to the agent, other embodiments could use any other type of GAI. However, the GAI is such that it does not indicate the value of the DTMF information. Thus, using the same sound for all types of DTMF information received would function to mask the information received. In other embodiments, the secure keypad information bridge could initiate a command to the secure audio speech bridge to generate the GAI to the agent, and block it from being provided to the IVR and the remote party.

Providing the GAI to the agent in real-time by the secure keypad information bridge 410 in response to receiving the out-of-band keypad information allows the agent to receive indications in real time that the remote party is responding to the prompt without hearing the SFI. Thus, even if the agent is not looking at the screen presently when the remote party enters information, the agent will know by hearing the GAI that the remote party is providing information in response to a prompt.

As noted earlier, the SPAA 310 receives indications that digits have been entered by the remote party. These may be received via link 515 or 534. These indications could the actual values of the DTMF information or genericized indications. Typically, the actual values are provided to the SPAA. The SPAA will then provide genericized visual indications ("GVI") via link 520 for display to the agent. The GVI is an ASCII character that is displayed to the agent in lieu of the numerical value. Thus, the GVI is a generic symbol or token that represents that information has been received, but without actually indicating the information itself. In one embodiment, the GVI is an asterisk ("*") that is displayed to the agent. Thus, a 16 digit credit card number may be displayed to the agent as "**   ". However, any single symbol could be used. In some embodiments, the SPAA will display the actual DTMF value for the last 3 or 4 digits. This may be useful for the agent to distinguish which of several credit cards the remote party is using. Thus, for example, the 16 digit credit card number could be displayed to the agent as "  ** *123" (assuming the last three digits of the credit card used are "123").

To summarize, the secure VoIP bridge 350 can be configured so that when the remote party provides DTMF information, the information is provided to the IVR and the SPAA, and corresponding GAI is provided to the agent. Further, corresponding GVI information is also provided to the agent on a pop-up window on the agent's computer display. Thus, the agent is provided with generic visual and aural information corresponding to the data entered by the remote party.

FIG. 5 does not illustrate the call recording system, which may record the call, including the secure payment transaction. The call recording system would record the call as heard by the agent. Thus, a call leg from the e.g., bridge 428 to the recording storage system 136 could exist, so that a record of the call is maintained. The call recording would not store any SFI, and hence, no exposure to SFI occurs if the call recording is reviewed.

Secure VoIP Bridge

As shown in FIG. 5, the secure audio speech bridge is used for controlling the dissemination of speech audio from the remote party, IVR, and agent. In various configurations, the agent may hear the IVR prompts and the remote party's responses. In other configurations, the agent may only hear the IVR prompts, but not the remote party's responses (such as in the case if the IVR incorporates speech recognition).

One structure for the VoIP secure audio speech bridge is disclosed in U.S. Pat. No. 8,831,204 entitled Protecting Sensitive Information Provided By A Party To A Contact Center and U.S. Pat. No. 9,307,084, also entitled Protecting Sensitive Information Provided By A Party To A Contact Center, the contents of which are incorporated by reference. This illustrates how individual unidirectional VoIP call legs can be established and controlled for the dissemination of audio information using a combination of splitters and combiners.

Pop-Up Window

Assistance to the agent during the secure payment transaction may be provided by the SPAA 310 via a pop-up window displayed on the agent's computer. The pop-up window provides visual information to the agent regarding the progress during transaction regarding the various steps, provides guidance as to scripts that the agent may provide, and allows functions controlling the secure payment transaction to be invoked by the agent.

Figure 6:
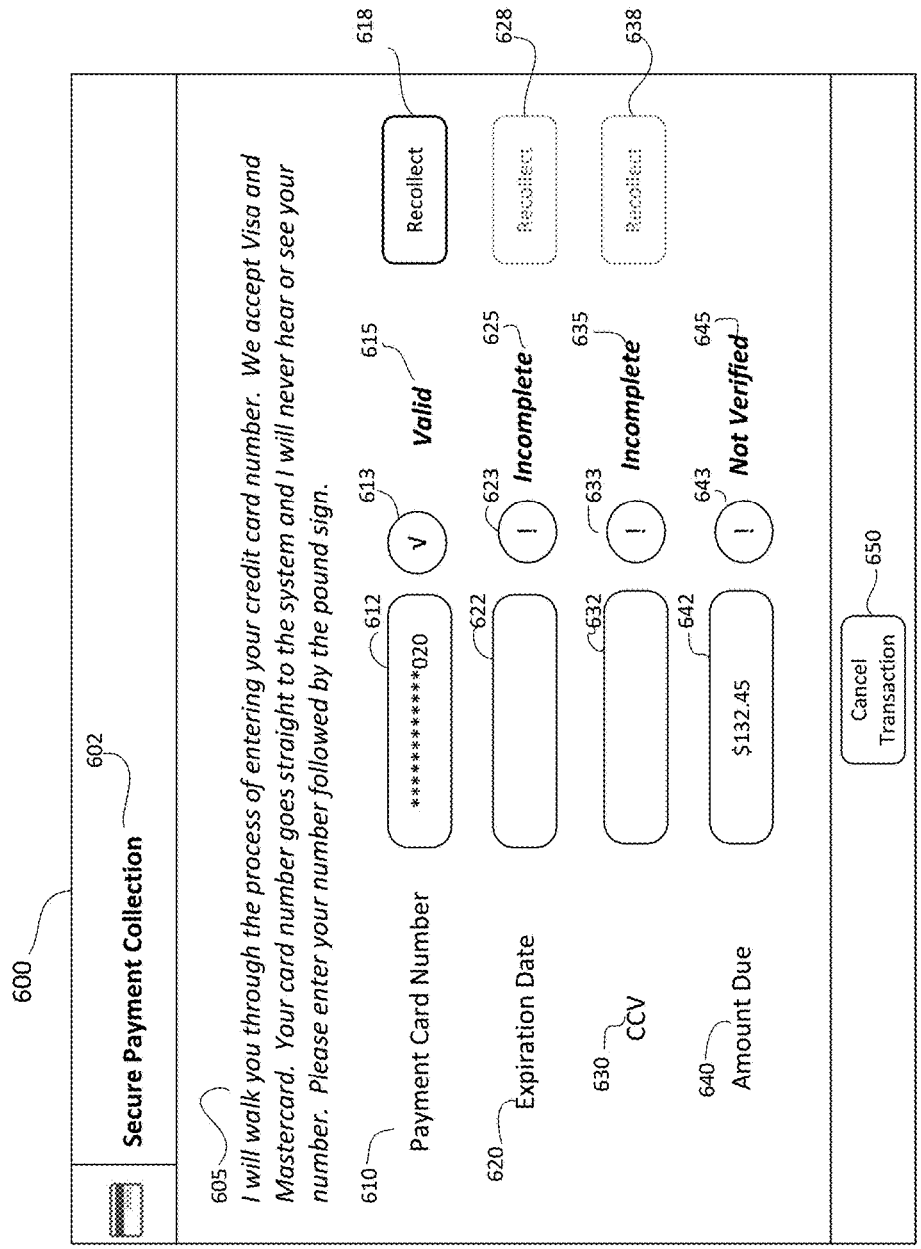
FIG. 6 illustrates one embodiment of a pop-up window presented to an agent for assisting in the secure payment transaction.

One embodiment of a pop-up window is shown in FIG. 6. The pop-up window 600 appears on the agent's computer display after invoking the secure payment function. The pop-up window 600 includes a header bar 602 indicating the purpose of the window. If the system is configured so that the agent provides the scripts, then a sample text script 605 is displayed to the agent, which the agent can read from to the remote party.

A series of credit card information types 610, 620, 630, and 640 are shown. The first is the payment card number 610, or more specifically, a credit card number. A corresponding data field 612 is shown. In this embodiment, a series of GVI comprising asterisks are shown to the agent as information is entered by the remote party. The last three digits are represented via roman numerals and are not technically a GVI, because the last three digits actually correspond to the number. A validation indicator symbol 613, comprising a check mark indicates the information has been received and has been initially verified. There are well known algorithms for checking the digits of a card number, which must follow certain industry norms. If the check passes, a corresponding text indicator 615 is presented, which could be considered another form of a validation indicator. There validation indicator may reflect that the number has a passed an initial validation algorithm, such as the Luhn algorithm, which is well known in the industry. The validation indicator may reflect that the proper number of digits has been received, the values correspond with the type of card, etc. The validation indicator does not necessarily reflect that the transaction is approved, which is a separate indicator that the transaction has been successfully completed.

The next information type 620 is the expiration date, and a corresponding date field 622 is shown. In this example, the status symbol 623 indicates the value is not complete or has not been verified. Thus, the corresponding text indicator is shown 625. Similar information types 630 are shown for the CVV, the date field 632, the status indicator 633 and the text indicator 635. Finally, the amount due 640 is indicated with the value 642 indicated. The procedures may require the agent to verbally verify that this is the amount to be charged, and hence the status symbol 643 and the text indicator 645 reflects that this verification has not yet occurred.

The agent may be presented with functions that can control the progression of the secure payment transaction. The recollect function 618 allows the agent to request restarting the payment process at this point of information collection. Thus, when the agent selects this icon, it is interpreted as a recollect function request. In this example, the card number has been collected, and verified. At this point during the process, the card number is eligible to be recollected. Recollecting information means that any collected information is erased, and the prompt is played again for the remote party to reenter that information. Invoking the recollect function also resets the status indicator, the text indicator, and any other variables for that information field. It also resets any prior information collected after that information field. Thus, the recollect function can be useful if the agent needs to 'backup' at a particular earlier point during the transaction.

For example, if the party entered a credit card number, and entered an expiration date, but then indicated to the agent that they want to use a different card, the agent could invoke the recollect function 618, which would restart collection of the card number and erase the expiration date information. This is easier and faster than cancelling the entire payment transaction and starting over. The other recollect function icons 628, 638 are shown in a grayed out manner, since the secure payment transaction has not yet progressed to that point where the other card information data can be recollected. Hence, these functions 628, 638 cannot be invoked.

There are several recollection function icons 618, 628, and 638 shown. As the transaction progresses and more information is collected, these icons are shown in a non-grayed out manner, indicating to the agent that they can be invoked. If all are able to be invoked and the agent invokes the first recollection icon 618, then doing so will also reset all of the information collected after that point. Thus, for example, if transaction has progressed to the point that the amount is ready to be verified and the agent invokes the first recollect function 618, then that will cause the resetting of not only the card number, but the expiration date and CCV information.

The pop-up window 600 also allows the agent to invoke a cancel transaction function 650 (also called a cancellation function). This will end the secure payment transaction prior to completion, and discard any collected information. This can be used if the remote party indicates, e.g., they do not want to complete the payment transaction at the moment. The pop-up window may be removed from the agent's computer display in response, and the IVR may be then disconnected from the call. This can occur automatically, when the agent cancels the transaction.

Figure 7:
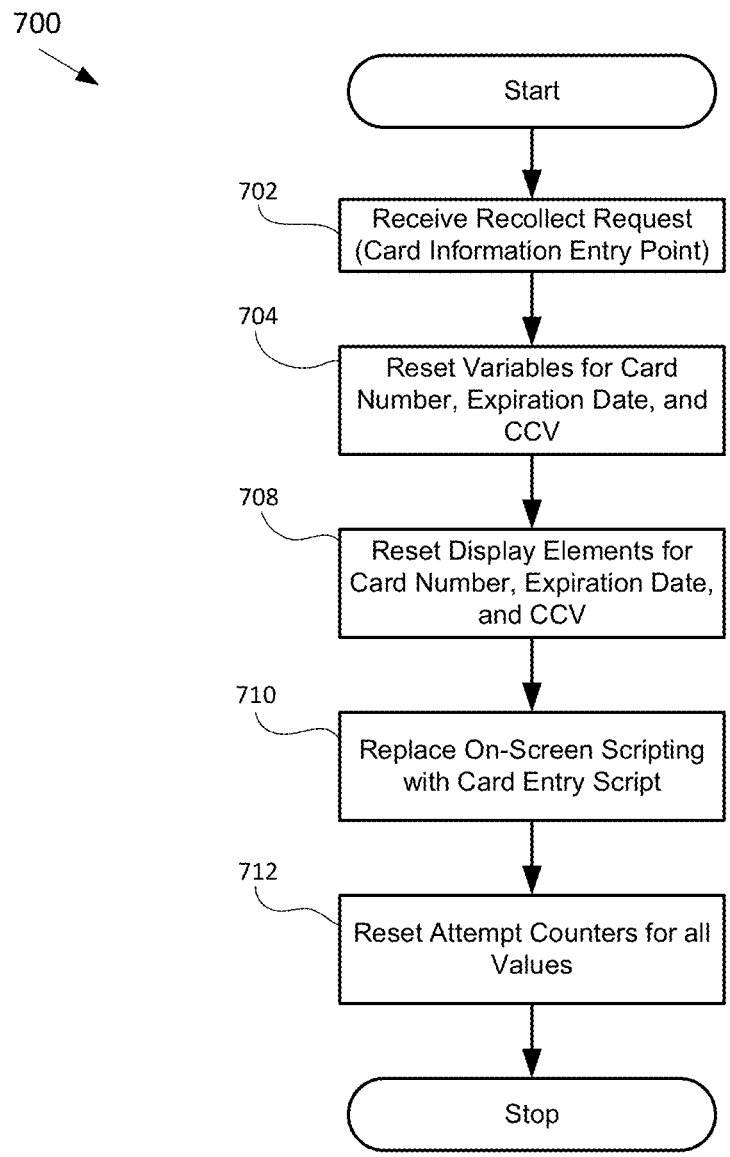
FIG. 7 illustrates one embodiment of a process flow for processing a recollect function request from the agent.

A process flow illustrating how the recollection function operates is shown in FIG. 7. Turing to FIG. 7, the process flow 700 is defined for a particular recollection function, since its operation is dependent on when it is invoked during a payment transaction. This example reflects invoking the card information recollection function 618. The first step involves receiving the invocation at operation 702, which is identified as the initial recollection function (i.e., for the card number information entry point). This causes any and all variables associated with that card number to be reset, including the number itself, the expiration data, and the CCV in operation 704. Next, the display elements in the pop-up window are reset in operation 708. This includes, the card information, its verified status, and its associated text indicator. If the agent is providing the prompt, then the associated script the agent should state is displayed to the agent in operation 710. Finally, all associated counters and timers should be reset in operation 712. The process is then completed.

Secure Payment Process Flow

Figure 8:
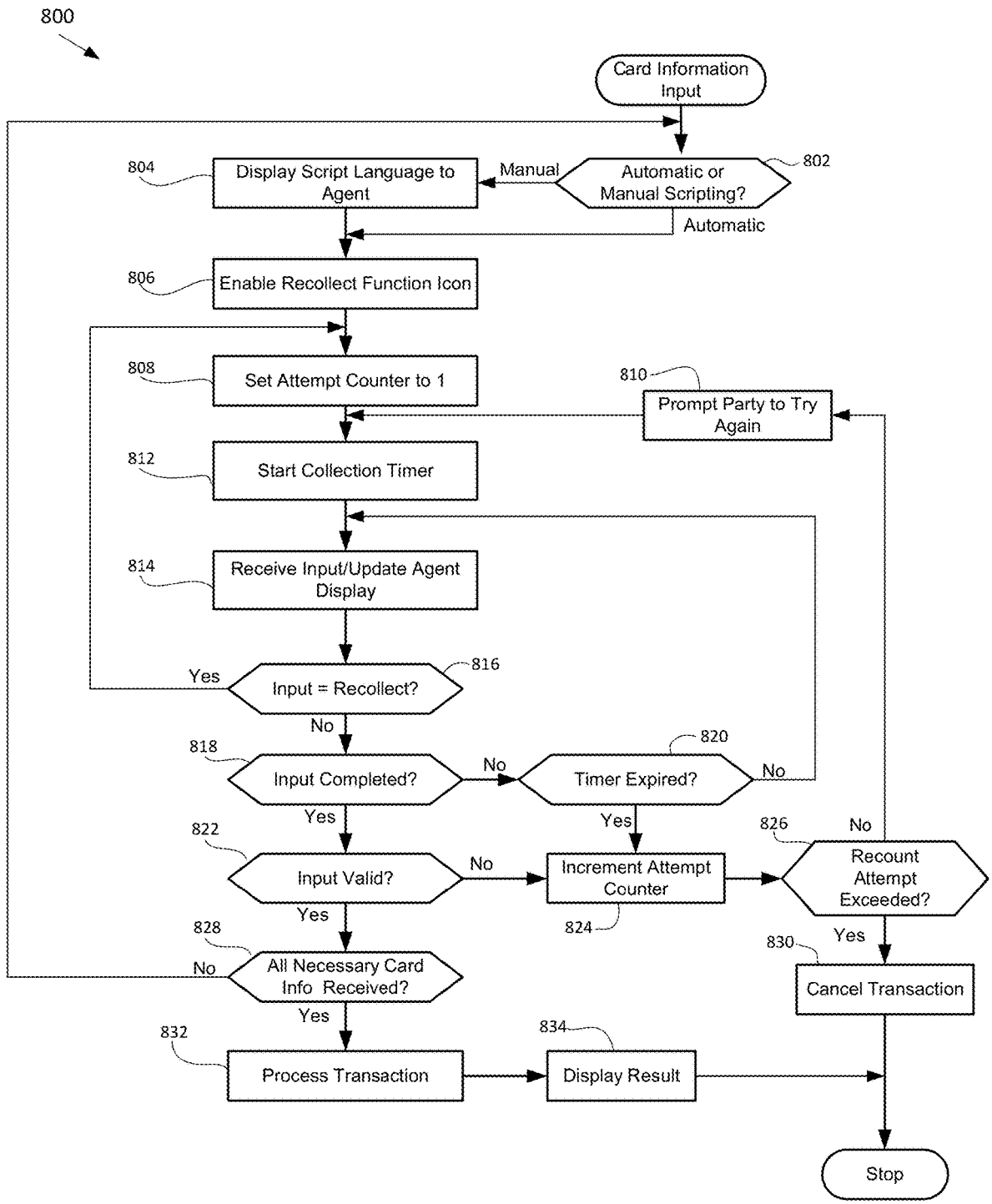
FIG. 8 illustrates one embodiment of a process flow for processing information associated with a secure payment transaction.

The secure payment process flow can be described from the perspective of what the agent see, what the SPAA performs, what the IVR processes, and what the remote party experiences. At a high level, an illustrative embodiment of the processing from the SPAA perspective is shown in FIG. 8. This is not intended to be a complete and exhaustive description, but sufficient to convey major aspects of the operation.

The process presumes that the agent has invoked the secure payment transaction at their computer. The pop-up window is displayed to the agent, and the SPAA is informed of the request. The process begins with the SPAA ascertaining whether the payment process is configured for automatic or manual scripting in operation 802. In automatic scripting, the IVR provides the prompts to the remote party, while with manual scripting, the agent speaks the prompts to the remote party. If manual scripting is configured in operation 802, then the appropriate script is displayed to the agent in the pop-up window in operation 804. Typically, a corresponding script is displayed for each of the elements that the agent prompts the remote party.

Next, the recollect function icon is enabled in operation 806. In the initial pass, the first recollect function icon is enabled, which is typically for collecting the card number or account number. Next, the attempt counter is set to 1 in operation 808. This is a collection attempt counter that tracks how many times the remote party has attempted to enter information at this point. The collection attempt counter allows the remote party to try again, if information entered is incorrect. For example, the remote party may mis-enter the card number, and it may fail an initial validation. The remote party may try again, but a limit is defined by the collection attempt counter as to how many attempts may be made by the remote party.

Next, a collection timer is started in operation 812. This timer defines how long the IVR will wait for entry of information before it times out. In the next operation 814, information from the remote party is received. Initially, this would be for the card number, since that is typically the first information collected. The SPAA will also update the agent's display in response to the numbers being entered. Although typically not a function of the SPAA, the VoIP secure bridge via the secure keypad bridge will also provide GAI to the agent.

If input is received in operation 816 from the agent invoking the recollect function, the process loops back to operation 808. Otherwise, a test is made in operation 818 to determine if the input is completed in operation 818. If not, then another test is made to see if a timer has expired in operation 820. If not, then agent is displayed with the prompt in operation 810 and the process continues to collect input. If the timer has expired in operation 820, the attempt counter is incremented, and a test is made in operation 826 to see if another attempt may be made. If the counter is not exceeded, then the process continues with operation 810 and the data collected is erased. If the number of attempts has been exceed, then the transaction is cancelled in operation 830. The process then terminates.

Returning to operation 818, if the input is completed, e.g., all the necessary information is received, then a test may be performed in operation 822 to see if the information conforms to certain industry standards. For example, the so-called Luhn algorithm test may be performed on the credit card number, which can quickly indicate if the number is invalid. If invalid, the attempt counter is incremented in operation 824, and test is made in operation 826 to determine if further attempts may be made.

If the input is valid in operation 822, then another test is made in operation 828 to see whether all the necessary information has been received (e.g., in addition to the credit card number, the expiration data and CCV number is required). If this has not been received, then the process loops back to collect these additional information. If all the information has been received at operation 828, then the transaction may be processed in 832. The SPAA causes the outcome of the transaction to be displayed to the agent in operation 834, and the process completes.

Those skilled in the art will recognize that at various operations shown in FIG. 8, that additional processing may be performed by the SPAA. For example, the SPAA manages the display of information in the pop-up window presented to the agent. Thus, as information is collected and verified, the appropriate updates to the pop-up window are performed. Further, based on the above, one skilled in the art could define a corresponding process flow for the IVR. The pop-up window may use particular colors/fonts/and icons to indicate the flow of the transaction and the corresponding status of the information entry.

Configuring the Secure Payment Agent Assisting Service

There are various configuration parameters associated with the SPAA service. These are typically configured by a contact center administrator prior to processing of the service. The administrator may interact using a workstation 157 that interacts with the appropriate components. The administrator may be presented with a pop-up configuration window, which defines for the SPAA how the components operate.

Turning to FIG. 9, one embodiment of a configuration graphical user interface ("GUI") is presented. This GUI 900 has a header section 905 that indicates it is used to define the flow of how data is collected. The first option 910 is a prompt-type parameter that indicates whether the prompts are provided by the agent ("manual") or by the IVR ("automatic"). "Manual" scripting means the agent will read scripts that are presented to the agent for the prompts to the remote party, whereas "automatic" means the IVR will provide the prompts to the remote party via recorded audio. This example has selected "manual" for the prompt-type parameter setting. The following information shown in FIG. 9 may be then adapted for this selected option, e.g., manual scripting. If automatic were selected, the information shown in FIG. 9 would differ in that at least no scripts would be needed to be defined for the agent to read. The highlighted tab 912 below the first option indicates that the GUI is directed to data collection.

Another option 915 allows a setting as to whether "backtracking" or recollect will be allowed to be invoked by the agent. If not allowed, the corresponding icons may not be displayed, or may be grayed out on the pop-up display window indicating the agent the function cannot be invoked. In this example, backtracking is configured to be allowed.

The next section 920 indicates the script that will be displayed to the agent. In this embodiment, there are scripts that may be displayed to the agent at the beginning of the payment transaction, at the collection of the card number, at the collection of the expiration date, at the collection of the verification code, and for the confirmation of the amount to be paid. These scripts can be created and edited by the administrator as appropriate. For example, certain campaigns may use a particular SPAA process where the agent is provided a script to prompt the remote party to enter in a particular brand of a credit card number.

Another option 925 available involves setting how many of the card number digits will be exposed to the agent. In one embodiment, no (zero) digits are exposed to the agent, whereas in other embodiments, three or four digits may be exposed. Finally, another option 928 allows defining whether the CVV is required, and another option 930 indicates whether the payment amount requires verification by the party. These values are used by the SPAA to control the flow of the payment transaction, defining what information is collected, what scripts are displayed, and how the GUI is formatted to the agent.

Another set of parameters that may be set by the administrator is used to define further details as to how information is collected and how errors are handled. One embodiment of this GUI is shown FIG. 10. In FIG. 10, the GUI again shows the selected scripting option 1003 that was previously selected. The tab 1004 indicates that this GUI is for defining timeouts and attempt counters when collecting data.

Each of the different types of information collected have a corresponding timer 1005, 1020, 1030 defined. These timers indicate a maximum time that may pass for collecting the corresponding data before a timeout error will occur. Further, each of the different types of information also have a corresponding attempt counter 1010, 1025, 1035, and 1045 defined. In this embodiment, this is set to three attempts. After three incorrect attempts, whether by input error or timeout, the overall transaction will be cancelled. Furthermore, for each of the information types, the corresponding scripts 1012, 1015 are shown that will displayed to the agent based on whether the information collected is valid or not.

Thus, by setting the parameters appropriately, the administrator can control the flow of how a secure payment transaction will occur. The agent is assisted at each step of the process, and can monitor the results of the input each step of the way, but without being exposed to sensitive financial information.

Alternative Configurations

In various embodiments, the operation of the secure VoIP bridge may be configured different, based on whether automatic or manual prompts are provided. In one embodiment, when automatic prompts are provided, the agent may be placed in an audio receive-only mode, where the agent can hear the IVR prompts only. No audio response from the remote party is provided to the agent. Thus, the audio to the agent is selectively muted by controlling switch 425 so that when prompts are played, the switch is closed, but when the prompt is completed, the switch is open. This may be useful if a speech analytics component is incorporated into the IVR so that the responses provided by the remote party may be either speech or DTMF. In this way, the agent does not hear sensitive information regardless of whether the party speaks or presses DTMF keys to provide the information. If the speech recognition is not used, and the party only provides DTMF, then the switch 425 may be closed for the duration of the transaction. However, the speech from the agent may still be muted (or not). If the agent is allowed to speak, the agent can assist the remote party if they have questions or difficulties during the transaction.

If manual prompts are provided, then obviously the agent must be able to provide speech to the remote party. In this case, a corresponding switch (not shown in FIG. 5) may be implemented to suppress the agent's speech to the IVR. Since the IVR would not recognize speech, then no loss of capability is realized by blocking the agent's speech to the IVR. When the remote party provides a response via DTMF, that will not be provided to the agent, but the agent will hear the GAI and the DTMF information is provided to the IVR. During this time, the agent may still speak to the remote party, and answer any questions that they may have.

Licensing Options

A set of licenses may be associated with the secure payment transaction, such that the maximum number of simultaneous secure payment transactions that may occur by a set of agents is limited by the number of licenses. Each time a secure payment transaction is invoked, a check is made to see if a license is available. This can be implemented using a license counter that tracks the number of licenses in use, corresponding to the number of pending SPAA transactions pending. If no licenses are available, e.g., the license counter equals zero, then a corresponding error message may be displayed to the agent, and a message could be provided to the administrator indicating the transaction could not occur because of a shortage of the number of licenses. The agent may have to wait a while before successfully invoking the feature. If a license is available, then a counter of available licenses is decremented in response to the agent invoking the feature. Once a transaction is completed, then the counter of available licenses is incremented by one. In this manner, a pool of secure payment transaction licenses is defined that controls the number of simultaneous transactions that may occur.

Encryption

The information collected from the remote party is passed through the secure keypad information bridge, and hence is not stored. However, the keypad information is provided to the IVR, which must buffer and maintain the information, until all information is obtained, and then the processing of the transaction may occur. During this time, the information may be stored in an encrypted manner, so as to provide further security. The information may be sent via, e.g., a web services application programming interface to a financial institution for payment processing, and if so, the transmission of the SFI may be encrypted as well.

Call Recording

Calls involving a remote party may be routinely recorded. In this embodiment, recording the audio heard by the agent will ensure that the recording never contains any SFI, since the audio provided to the agent will never include the SFI. Thus, even if unauthorized individuals have access and can hear the recording, no SFI provided during a payment transaction will be heard. This may be configured on a campaign basis, and an option on the configuration menu may be presented allowing the administrator to control whether call recording of the transaction occurs or not.

Speech Analytics

As noted earlier, a speech analytics or speech recognition component could be included in the IVR or bridged on separately to the call. This allows the remote party to speak or enter their card information. In such cases, the audio from the remote party should be blocked to the agent, in addition to blocking any transfer of DTMF information to the agent.

DTMF Bleeding

The point of interworking 208 discussed in FIG. 2 detects the DTMF on the analog channel, removes the DTMF tones in the audio, and generates an out-of-band message conveying the detected DTMF information. In some implementations, based on the equipment, "DTMF bleeding" may occur. This is when the DTMF audio is not completely removed or partially attenuated by the interworking device. In these cases, the DTMF tones may be heard in the audio channel by whatever entities are provided the audio. If this occurs, it may be necessary to open the switch 425 of FIG. 4 after the party is prompted for information, e.g., when the remote party is providing a response. By muting all audio to the agent when the remote party is entering information, any adverse impacts of DTMF bleed-thru can be avoided.

Exemplary Computer Processing Device

Figure 11:
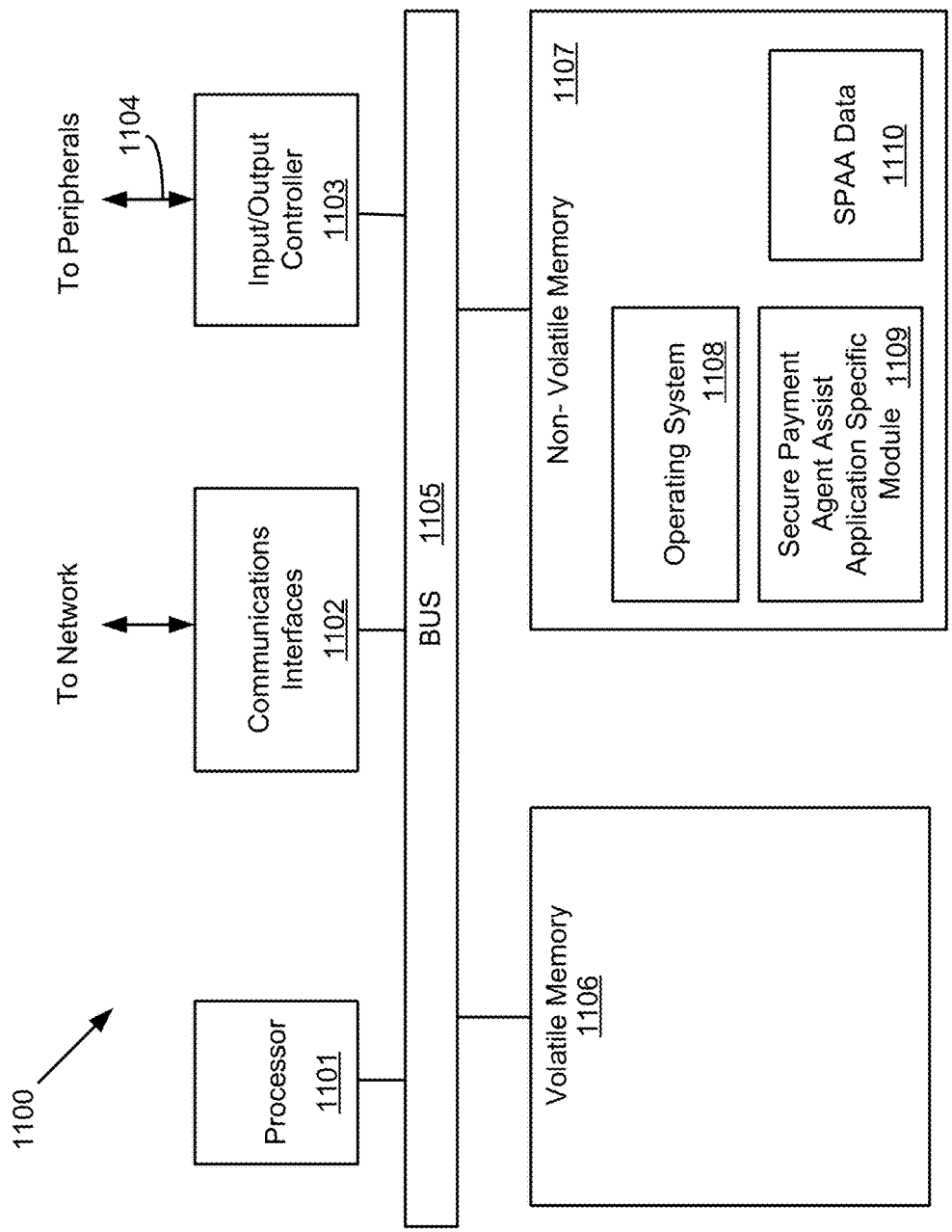
FIG. 11 illustrates one embodiment of a processing component that may be used in conjunction with the concepts and technologies presented herein.

FIG. 11 is an exemplary schematic diagram of a computer processing system that may be used in embodiments of various architectures, such as components shown in the architecture 100 of a contact center in FIG. 1 to practice the technologies disclosed herein. In general, the term "computer processing system" may be exemplified by, for example, but without limitation by any specially configured or programmed: personal computer, server, desktop computer, tablet, smart phone, notebook, laptop, distributed processing system, server, blade, and the like, as well as any combination of devices or entities adapted to perform the functions described herein, such that the resulting system is a specialized processing system configured to perform the functions and capabilities disclosed herein. The computer processing system may also be a specially configured system, designed to optimize the operation of the component in the contact center based in part on the specialized software configured to perform the functions disclosed herein. For example, the "communications handler" could be a computer processing system that is specially configured to perform the functions disclosed herein. A "communications handler" as used herein would be interpreted by one skilled in the art as a special purpose processing system, performing functions that are not typical of a generic computer. This also may be the case for the other components disclosed herein including the various dialing components, SMS gateway, RTSA components, dialing list storage systems, etc.

As shown in FIG. 11, the processing system 1100 may include one or more computing processors 1101 that may communicate with other elements within the processing system 1100 via a bus 1105. The computing processor 1101 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like. In many cases, in order to perform the necessary analysis, such as determining frequencies, energy level, etc. of the audio signal, this will requires something more than a general purpose computer processor, such as a DSP processor.

In one embodiment, the processing system 1100 may also include one or more communications interfaces 1102 for communicating data via a network (such as LAN 170 from FIG. 1) with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1103 may also communicate with one or more input devices or peripherals using an interface such as, but not limited to: a keyboard, a mouse, a touch screen/display input, microphone, pointing device, etc. The input/output controller 1103 may also communicate with output devices or peripherals, such as displays, printers, speakers, headsets, banner displays, etc.

The computing processor 1101 may be configured to execute instructions stored in volatile memory 1106, non-volatile memory 1107, or other forms of computer readable storage media accessible to the processor 1101. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1107 may store program code and data, which also may be loaded into the volatile memory 1106 at execution time. For example, the non-volatile memory 1107 may store one or more modules 1109 that may perform the above-mentioned process flows and/or operating system code 1108 containing instructions for performing the process and/or functions associated with the technologies disclosed herein. The SPAA module(s) 1109 may also access, generate, process, or store related data 1122, including, for example, the data described above in conjunction with performing the various aspects of SPAA in the non-volatile memory 1107, as well as in the volatile memory 1106. This would include, but is not limited to: SPAA operation, SPAA configuration values, timer values, counter values, account related data, call records, or any other data used to perform the disclosed functions and concepts. The volatile memory 1106 and/or non-volatile memory 1107 may be used to store other information including, but not limited to: records, applications, programs, scripts, source code, object code, byte code, compiled code, interpreted code, machine code, executable instructions, or the like. These may be executed or processed by, for example, the computing processor 1101 and may form a part of, or may interact with, the module(s) 1109. The module 1109 is shown as being the SPAA module, but it could be any other module used to perform the concepts disclosed herein.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory or propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for assisting an agent in a contact center when processing sensitive information from a remote party during a transaction involving sensitive information comprising:
defining a prompt-type parameter indicating whether a prompt for the sensitive information to the remote party is to be provided during the transaction by the agent or by an interactive voice response ("IVR") playing a recorded prompt;
processing a call by a call handler involving the agent and the remote party;
requesting to the call handler, by the agent using a computer during the call, initiation of the transaction to process the sensitive information during to the call;
connecting the IVR by the call handler with the call using a voice over internet protocol ("VoIP") call leg;
determining the prompt-type parameter indicates the prompt for the sensitive information is to be provided by the agent;
displaying to the agent on a pop-up window on the computer a first prompt script for entering the sensitive information in response to determining the prompt-type parameter indicates the prompt for the sensitive information is to be provided by the agent;
displaying to the agent on the pop-up window a generic visual indicator ("GVI") of the sensitive information provided by the remote party; and
displaying to the agent on the pop-up window an indicator that the sensitive information was received.

2. The method of claim 1, wherein the method comprises:
receiving from the computer a recollect function request initiated by the agent; removing the indication of the GVI displayed on the pop-up window; and
re-displaying the first prompt script on the pop-up window in response to receiving the recollect function request.

3. The method of claim 2, further comprising:
resetting a collection attempt counter in response to receiving the recollect function request initiated by the agent.

4. The method of claim 1 wherein the method further comprises:
receiving from the computer a cancel request provided by the agent; and
detaching the VoIP call leg to the IVR of the call in response to receiving the cancel request.

5. The method of claim 1, further comprising:
decrementing a license counter after the agent invokes the initiation of the transaction request.

6. The method of claim 1, further comprising:
providing a generic audible indicator ("GAi") to the agent in response to receiving the sensitive information from the remote party.

7. The method of claim 1, wherein
the remote party provides the sensitive information by generating at least one dual tone multiple frequency ("DTMF") tone, wherein the at least one DTMF tone is not provided to the agent, and
a message conveying a numerical value indicated by the at least one DTMF tone is provided to the IVR but not to the computer used by the agent.

8. A system for assisting an agent processing a transaction involving sensitive information, comprising:

a call handler configured to bridge a second voice over internet protocol ("VoIP") call leg onto a call with a remote party, the call comprising a first voice over internet protocol ("VoIP") call leg involving an agent, wherein the call handler is configured to:
retrieve a prompt-type parameter stored in memory prior to the call to determine whether a prompt for sensitive information is to be provided by the agent or an interactive voice response unit;
provide audio comprising speech from the agent to the remote party,
block dual tone multiple frequency ("DTMF") tones originating from the remote party from being provided as audio to the agent during the transaction, and
provide generic audio indications ("GAI") correlating to the DTMF tones originating from the remote party to the agent during the transaction, wherein the GAI do not indicate a numerical value corresponding to the DTMF tones;
the interactive voice response unit ("IVR") configured to receive a series of messages conveying numerical information from the call handler,
wherein the series of messages indicate the numerical information conveyed by the DTMF tones generated by a phone device used by the remote party in response to the prompt for the sensitive information during the transaction, and
wherein the second VoIP call leg connects the IVR; and
a computer used by the agent configured to:
display a prompt script to the agent after the call handler determines the prompt-type parameter indicates the prompt for the sensitive information is to be provided by the agent;
display a series of generic visual indicators ("GVI") on a pop-up window,
wherein the pop-up window appears after the agent causes the IVR to be bridged onto the call using the second VoIP call leg,
wherein the series of GVI correlates to the DTMF tones generated by the phone device used by the remote party, and
wherein the series of GVI do not indicate the numerical information to the agent.

9. The system of claim 8, wherein the computer is further configured to display a validation indicator indicating the sensitive information provided by the remote party was processed.

10. The system of claim 8, wherein the call handler is configured to:
receive the numerical information corresponding to the DTMF tones generated by the phone device conveying the sensitive information during the transaction; and
generate a corresponding series of messages indicating the numerical information to the IVR.

11. The system of claim 8, wherein the call handler is configured to provide speech audio from the remote party to the agent during the transaction.

12. The system of claim 8, wherein the computer used by the agent is
configured to: transmit a recollect function request when requested by the agent; and
receive a command after sending the recollect function request to remove the series of GVI from the display on the pop-up window.

13. The system of claim 8, wherein the call handler is configured to disconnect the second VoIP call leg to the IVR in response to receiving a command from the computer before completion of the transaction indicating the transaction is cancelled.

14. The system of claim 8, wherein the computer is configured to:
receive a message indicating the sensitive information is received; and
display an indicator to the agent in response to receiving the message.

15. A non-transitory computer readable medium storing instructions that when processed by a computer processor to:
transmit a first message to a call handler processing a call in response to an agent invoking a transaction for processing sensitive information comprising numerical values provided by a remote party on the call;
receiving a second message after transmitting the first message, the second message comprising text of a prompt for the sensitive information to be displayed to the agent after the call handler determines a prompt-type parameter indicates prompts are to be provided by the agent, wherein the prompt-type parameter is stored in memory prior to the call;
receiving a series of messages corresponding to entry of the sensitive information by the remote party, wherein the series of messages cause a series of generic visual indicators ("GVI") displayed to the agent, wherein each generic visual indicator does not indicate the numerical values of the sensitive information;
receive a message thereby causing an indicator to be displayed to the agent representing the sensitive information has not been validated by an interactive voice response unit ("IVR");
generate a recollect message to the IVR in response to the agent selecting a recollect function indicator; and
receive a message causing the indicator and the series of GVI to be removed from being displayed to the agent.

16. The non-transitory computer readable medium of claim 15, wherein the call handler establishes a VoIP call leg to the IVR in response to receiving the first message.

17. The non-transitory computer readable medium of claim 16, wherein the call handler terminates the VoIP call leg to the IVR in response to receiving a message sent in response to the agent invoking a transaction cancellation function.

18. The non-transitory computer readable medium of claim 15, wherein the call handler generates a series of generic audible indications ("GAI") corresponding to the series of GVI displayed to the agent.

19. The non-transitory computer readable medium of claim 15, wherein the sensitive information comprising numerical values provided by a remote party on the call are provided by voice.

20. The non-transitory computer readable medium of claim 15, wherein the instructions further cause the computer processor to:
receive a second message comprising second text of a second prompt to be displayed to the agent for prompting the remote party for the sensitive information.

* * * * *